United States Patent
Mikami et al.

(10) Patent No.: US 9,828,280 B2
(45) Date of Patent: *Nov. 28, 2017

(54) GLASS, OPTICAL GLASS, GLASS RAW MATERIAL FOR PRESS MOLDING, AND OPTICAL ELEMENT

(71) Applicant: HOYA CORPORATION, Tokyo (JP)

(72) Inventors: Shuhei Mikami, Tokyo (JP); Yasuhiro Fujiwara, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/148,354

(22) Filed: May 6, 2016

(65) Prior Publication Data

US 2016/0251257 A1    Sep. 1, 2016

Related U.S. Application Data

(63) Continuation of application No. 14/410,240, filed as application No. PCT/JP2013/067051 on Jun. 21, 2013, now Pat. No. 9,359,246.

(30) Foreign Application Priority Data

| Jun. 22, 2012 | (JP) | 2012-141452 |
| Jun. 22, 2012 | (JP) | 2012-141453 |
| Jun. 22, 2012 | (JP) | 2012-141454 |
| Oct. 31, 2012 | (JP) | 2012-240953 |
| Oct. 31, 2012 | (JP) | 2012-240954 |
| Oct. 31, 2012 | (JP) | 2012-240955 |
| Apr. 26, 2013 | (JP) | 2013-094498 |
| Apr. 26, 2013 | (JP) | 2013-094501 |

(51) Int. Cl.

| $C03C\ 3/21$ | (2006.01) |
| $C03C\ 3/064$ | (2006.01) |
| $C03B\ 11/00$ | (2006.01) |
| $C03B\ 5/16$ | (2006.01) |
| $C03B\ 5/193$ | (2006.01) |
| $C03B\ 5/43$ | (2006.01) |
| $C03C\ 3/068$ | (2006.01) |

(52) U.S. Cl.
CPC ............ $C03C\ 3/21$ (2013.01); $C03B\ 5/16$ (2013.01); $C03B\ 5/193$ (2013.01); $C03B\ 5/43$ (2013.01); $C03B\ 11/005$ (2013.01); $C03C\ 3/064$ (2013.01); $C03C\ 3/068$ (2013.01); $Y02P\ 40/57$ (2015.11)

(58) Field of Classification Search
CPC .... C03C 3/16; C03C 3/17; C03C 3/19; C03C 3/21

See application file for complete search history.

(56) References Cited

U.S. PATENT DOCUMENTS

| 7,309,670 B2 | 12/2007 | Fujiwara et al. |
| 7,994,082 B2 | 8/2011 | Zou et al. |
| 8,647,994 B2 | 2/2014 | Fujiwara |
| 8,716,157 B2 | 5/2014 | Fujiwara et al. |
| 9,359,246 B2 * | 6/2016 | Mikami ................ C03C 3/21 |
| 2011/0126976 A1 | 6/2011 | Kikutani et al. |

FOREIGN PATENT DOCUMENTS

| CN | 1576252 A | 2/2005 |
| CN | 1772674 A | 5/2006 |
| JP | 2008-273791 A | 11/2008 |
| JP | 2009-143801 A | 7/2009 |
| JP | 2010057893 A | 3/2010 |
| JP | 2011042556 A | 3/2011 |
| JP | 2011046550 A | 3/2011 |
| JP | 2011246344 A | 12/2011 |

OTHER PUBLICATIONS

Sep. 10, 2013 International Search Report issued in International Application No. PCT/JP2013/067051.

* cited by examiner

*Primary Examiner* — Elizabeth A. Bolden
(74) *Attorney, Agent, or Firm* — Oliff PLC

(57) ABSTRACT

A glass including at least one type of oxide selected from $TiO_2$, $Nb_2O_5$, $WO_3$, and $Bi_2O_3$ as a glass component therefor, having a total $TiO_2$, $Nb_2O_5$, $WO_3$, and $Bi_2O_3$ content of at least 20 mol %, and having a βOH value indicated in formula (1) that fulfills the relationship indicated in formula (2).

$$\beta OH = -[\ln(B/A)]/t \quad (1);$$

$$\beta OH \geq 0.4891 \times \ln(1/HR) + 2.48 \quad (2).$$

11 Claims, 4 Drawing Sheets

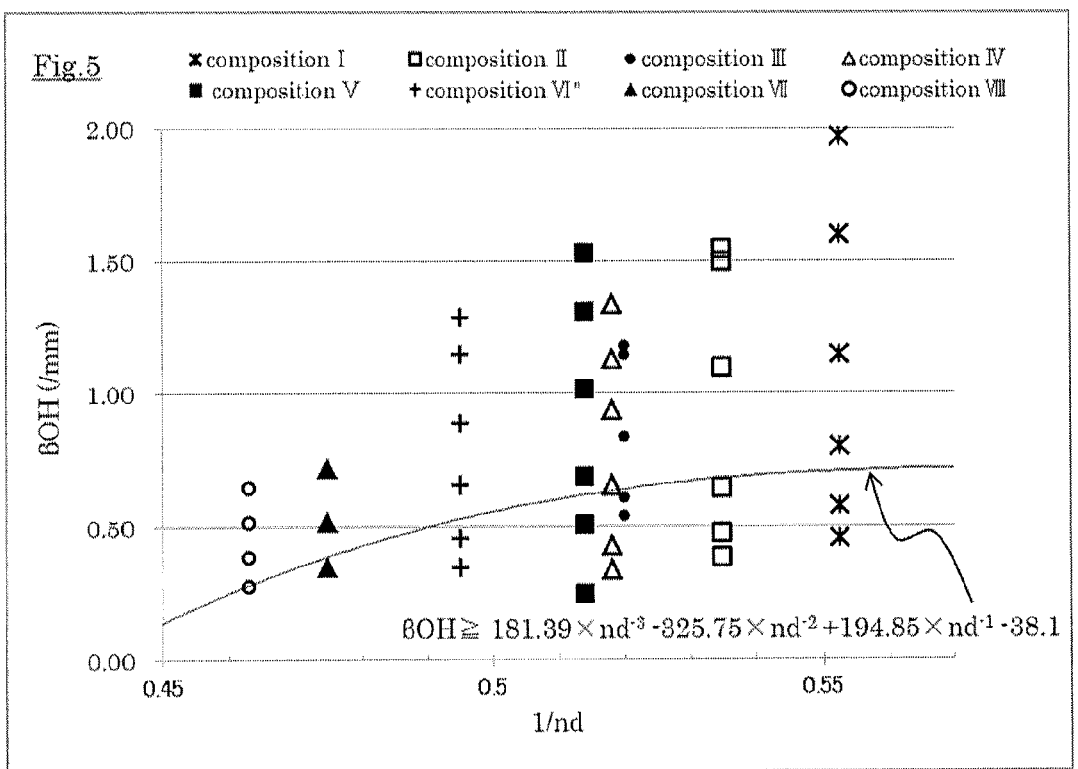

GLASS, OPTICAL GLASS, GLASS RAW MATERIAL FOR PRESS MOLDING, AND OPTICAL ELEMENT

This is a Continuation of application Ser. No. 14/410,240 filed Dec. 22, 2014, which is a National Stage Application of PCT/JP2013/067051 filed Jun. 1, 2013. The entire disclosures of the prior applications are hereby incorporated by reference herein their entirety.

TECHNICAL FIELD

The present invention relates to a production method of glass, optical glass, press-molding glass and optical element having excellent transmittance.

DESCRIPTION OF THE RELATED ART

Recently, as devices of photographic optical system and projection optical system or so has become more functional and more compact, there are increasing needs of an optical glass having high refractive index as the material of effective optical element.

The optical glass having high refractive index comprises large amount of high refractive index component such as Ti, Nb, W, Bi or so as the glass component. These components are easily reduced during the melting process of the glass, and these components being reduced absorbs the light of the short wave length side at the visible light range; thus the coloring of the glass increased (hereinafter, it may be referred as "reduced color").

Also, the high refractive index components which are easily reduced reacts (oxidizes) with noble metal material such as platinum or so which are widely used as the material of the crucible; and the noble metal ion produced by the oxidation of the noble metal causes to dissolve in the molten glass. The noble metal ion dissolved in the molten glass absorbs the visible light; hence the coloring of the glass increases.

The optical glass having high refractive index comprising a lot of high refractive index component had problems such as the coloring of the glass, and particularly the transmittance of the short wave length side at the visible light range easily decreased. As the means to solve such problem, the patent article 1 proposes the technical arts to bubble the non-oxidizing gas in the molten glass, or the technical art of heat treating the obtained glass by re-heating it.

However, when melting the glass comprising large amount of high refractive index component such as Ti, Nb, W, Bi or so, when bubbling the reducing gas such as carbon monoxide, hydrogen or so which are recited in the patent article 1, the high refractive index component added as the oxidized product is reduced and becomes metal, forms alloy with the metal material such as platinum or so constituting the melting container; thus the strength and the durability of the melting container declined significantly. Also, as the inactive gas such as helium or argon or so are expensive, these are not suitable for the bubbling taking long time as the production cost will increase.

Also, since the melting of the glass is generally carried out in the air atmosphere, the oxygen in the air may react with the noble metal material such as platinum or so which is the material of the melting container. Particularly, in case the melting container is platinum based material, platinum dioxide ($PtO_2$) is generated and dissolves into the molten material; or it may dissolve into the molten material as platinum ion ($Pt^{4+}$) from the boundary between the molten material and the platinum based material. As a result, coloring of the glass may occur.

Therefore, the technical art to bubble the non-oxidized gas as in the patent article 1 cannot sufficiently suppress the noble metal such as platinum or so from dissolving into the glass, thus it was still difficult to significantly reduce the coloring of the optical glass having the high refractive index.

PRIOR ART

Patent Article

[Patent Article 1] Japanese Patent Application Laid Open. No. 2011-246344

DISCLOSURE OF INVENTION

Problem to be Solved by the Invention

The present invention was achieved in view of such circumstances, and its object is to provide the glass, optical glass, press-molding glass and optical element having excellent transmittance.

Means for Solving the Problems

As a result of the keen examination in order to achieve the above mentioned object, the present inventors have found that by controlling the value of βOH of the glass, and the total amount (mol %) of the content of each component of $TiO_2$, $Nb_2O_5$, $WO_3$ and $Bi_2O_3$ included in the glass (hereinafter, it may be simply referred as "the content of the high refractive index component") to satisfy the predetermined relationship, the object thereof can be attained; and by such finding the present invention has been achieved.

The gist of the present invention wherein the object is to solve such problem is as described in below.

[1] A glass comprising at least one oxide selected from the group consisting of $TiO_2$, $Nb_2O_5$, $WO_3$ and $Bi_2O_3$ as a glass component, wherein a total content of said $TiO_2$, $Nb_2O_5$, $WO_3$ and $Bi_2O_3$ is 20 mol % or more, and a value of βOH shown in below equation (1) satisfies a relation shown in below equation (2).

$$\beta OH = -[\ln(B/A)]/t \quad (1)$$

$$\beta OH \geq 0.4891 \times \ln(1/HR) + 2.48 \quad (2)$$

[In the equation (1), "t" is a thickness of said glass used for a measurement of an external transmittance, "A" is the external transmittance (%) at a wavelength of 2500 nm when a light enters into said glass in parallel to a thickness direction thereof, and "B" is s the external transmittance (%) at the wavelength of 2900 nm when a light enters into said glass in parallel to the thickness direction thereof. In the equation (2), "HR" shows a total amount (mol %) of a content of each component of $TiO_2$, $Nb_2O_5$, $WO_3$ and $Bi_2O_3$ in said glass. In the equations (1) and (2), "ln" is natural logarithm.]

[2] The glass as set forth in [1], wherein a content of noble metal is 4 ppm or less.

[3] The glass as set forth in [1] or [2] comprising $P_2O_5$ as said glass component.

[4] An optical glass comprising the glass as set forth in any one of [1] to [3].

[5] A glass material for press-molding comprising the optical glass as set forth in [4].

[6] An optical element comprising the optical glass as set forth in [4].

The Effect of the Invention

According to the glass production method of the present invention, the transmittance of the glass can be improved drastically, by controlling the value of βOH of the glass, and the content of the high refractive index component to satisfy the predetermined relationship. Also, the amount of the noble metals such as platinum or so dissolved into the glass can be reduced significantly.

BRIEF DESCRIPTION OF DRAWINGS

FIG. 3 is a graph showing the change of the external transmittance (T450) at the wavelength of 450 nm when the light enters parallel to the thickness direction of the No. 1 glass having the thickness of 5 mm with respect to βOH value when βOH value of the No. 1 glass is changed from the composition of the Table 1.

FIG. 2 is a graph showing the change of the external transmittance (T450) at the wavelength of 450 nm when the light enters parallel to the thickness direction of the No. 3 glass having the thickness of 5 mm with respect to βOH value when βOH value of the No. 3 glass is changed from the composition of the Table 2.

FIG. 5 is a graph showing the relation between βOH and the refractive index of the sample according to the first modified example of the present invention.

THE EMBODIMENTS FOR CARRYING OUT THE INVENTION

Glass

Figure 1:
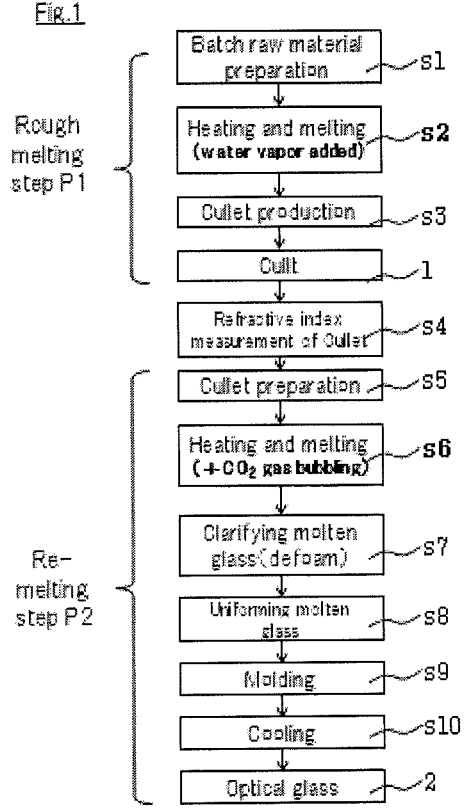
FIG. 1 shows the flow chart of steps from the preparation of the batch raw material to the production of the glass.

The glass according to the present invention is the glass including at least one oxide selected from the group consisting of $TiO_2$, $Nb_2O_5$, $WO_3$ and $Bi_2O_3$ (hereinafter, it may be simply referred as "the content of the high refractive index component") as a glass component, wherein a total content of said $TiO_2$, $Nb_2O_5$, $WO_3$, and $Bi_2O_3$ is 20 mol % or more, and a value of βOH shown in below equation (1) satisfies a relation shown in below equation (2).

$$\beta OH = -[\ln(B/A)]/t \quad (1)$$

$$\beta OH \geq 0.4891 \times \ln(1/HR) + 2.48 \quad (2)$$

Here, in the above equation (1), "t" is the thickness (mm) of said glass used for the measurement of the external transmittance, "A" is the external transmittance (%) at the wavelength of 2500 nm when the light enter into said glass in parallel to the thickness direction thereof, and "B" is the external transmittance (%) at the wavelength of 2900 nm when the light enter into said glass in parallel to the thickness direction thereof. Also, in the above equations (1) and (2), "ln" is a natural logarithm. The unit of βOH is $mm^{-1}$.

Note that, "external transmittance" is the ratio (Iout/Iin) of the intensity "Iout" of the transmitted light which transmitting out the glass with respect the intensity "Iin" of incident light which enters into the glass, that is the transmittance which considers the surface reflection at the glass surface as well; and "internal transmittance" which will be described in below refers to the transmittance in case there is no surface reflection at the glass surface (that is, the transmittance of the glass itself constituting the glass). Each transmittance can be obtained by measuring the transmission spectrum using the spectrophotometer.

Also, in the above mentioned equation (2), HR shows the total amount (mol %) of the content of each component $TiO_2$, $Nb_2O_5$, $WO_3$ and $Bi_2O_3$ in said glass. In order to obtain the high refractive index glass, the total content of $TiO_2$, $Nb_2O_5$, $WO_3$ and $Bi_2O_3$ is 20 mol % or more, that is the value of HR is 20 or more. Preferably, the lower limit of HR is 25, more preferably 30, and further preferably 35. Also, the upper limit of HR is preferably 85, more preferably 80, and further preferably 75.

Also, for the glass according to the present embodiment, the value of βOH shown in the above equation (1) preferably satisfy the relation shown in the below equation (3), more preferably satisfy the relation shown in below equation (4), and further preferably satisfy the relation shown in below equation (5).

$$\beta OH \geq 0.4891 \times \ln(1/HR) + 2.50 \quad (3)$$

$$\beta OH \geq 0.4891 \times \ln(1/HR) + 2.53 \quad (4)$$

$$\beta OH \geq 0.4891 \times \ln(1/HR) + 2.58 \quad (5)$$

Also, the upper limit of βOH differs depending on the type and the production condition of the glass, and as long as it can be adjusted, it is not particularly limited. If βOH is increased, the amount of the volatile product from the molten glass tends to increase, hence from the point of suppressing the volatilization from the molten glass, βOH is 10 $mm^{-1}$ or less, preferably 8 $mm^{-1}$ or less, more preferably 6 $mm^{-1}$ or less, even preferably 5 $mm^{-1}$ or less, even further preferably 4 $mm^{-1}$ or less, still more preferably 3 $mm^{-1}$ or less, and still even further preferably 2 $mm^{-1}$ or less.

βOH shown in the above equation (1) refers to the absorbance by hydroxide group. Therefore, by evaluating βOH, the concentration of water (and/or the hydroxide ion, hereinafter simple "the water") included in the glass can be evaluated. That is, the glass having high βOH means the water concentration included in the glass is high.

In the glass according to the present embodiment, the value of βOH satisfies the relation shown in the above equation (2). That is, the glass according to the present embodiment is controlled so that the water concentration in the glass to be higher than a certain value.

The method to make βOH higher in the glass is not particularly limited, however the procedure to increase the water content in the molten glass during the melting step may be mentioned. Here, as the procedure to increase the water content in the molten glass, for example the treatment to add the water vapor in the melting atmosphere, and the treatment of bubbling the gas including the water vapor into the molten material or so may be mentioned.

Usually, according to these methods, the water can be introduced into glass, and βOH can be increased, however the increasing rate thereof differs depending on the glass composition. This is because the easiness to take in the water to the glass differs depending on the glass composition.

In case the glass composition is those which take in the water easily, by carrying out the treatment to increase βOH as mentioned in the above, βOH of the glass can be increased significantly. However, in case the glass composition is those which barely takes in the water, even if the treatment is carried out in the same condition, it is difficult to increase the value of βOH to the same level as the glass composition which takes in the water easily, thus βOH of obtained glass becomes low.

Also, in case the glass composition is those which take in the water in easily, even if it is the glass produced by the usual production method, it actively take to the water in the melting atmosphere (the air atmosphere), hence the value of βOH becomes higher than the glass composition which barely takes in the water.

As such, the easiness to take in the water to the glass differs depending on the glass composition. Thus, in the present invention, the above mentioned equation (2) is defined based on the difference of easiness to take in the water by the composition, and the lower limit of βOH depending on the glass composition determined.

Here, in the above equation (2), HR is the total amount (mol %) of the content of each component $TiO_2$, $Nb_2O_5$, $WO_3$ and $Bi_2O_3$ in the 100 mol % of said glass.

As discussed in the above, depending on the glass composition, there is a glass wherein the water can be taken in easily and that βOH can be increased easily, and those glass which are not. As a result of the keen examination, the present inventors have found a tendency that the higher the ratio of each component of $TiO_2$, $Nb_2O_5$, $WO_3$ and $Bi_2O_3$ in the glass composition is, the easier the water is taken in, thereby the above mentioned equation (2) was determined.

The above mentioned equation (2) as such separates whether or not the glass has been carried out with the treatment to increase βOH during the production steps thereof. That is, during the production steps of the glass, the glass which did not carry out the treatment to increase βOH (the glass produced based on the conventional production method) does not satisfy the above mentioned equation (2).

Nevertheless, for the glass comprising large amount of the high refractive index component such as Ti, Nb, W, Bi or so as the glass component, usually the high refractive index components are reduced during the melting step of the glass, and absorbs the light at the short wavelength side of the visible light range, thus there was a problem that the coloring is increased in the obtained glass.

The coloring of such glass (hereinafter, it may be referred as the reduced color) is reduced by carrying out the re-heat treatment to the glass under the oxidizing atmosphere. This is thought to be caused as each ion such as Ti, Nb, W, Bi or so under the reduced state are oxidized by carrying out the re-heat treatment under the oxidizing atmosphere, thereby the visible light absorbance of each ion is weakened.

Particularly, in order to reduce the coloring in short period of time, it is necessary to make the oxidation speed of Ti, Nb, W, Bi or so faster during the heat treatment, and in order to do so, it is necessary to have ions which can oxidize Ti, Nb, W, Bi or so by moving inside the glass in a speedy manner and give the electric charge. As for such ion, $H^+$ is thought to be suitable.

Here, the glass according to the present embodiment satisfies the above mentioned equation (2). That is, it means that the sufficient water is introduced in the glass, and large amount of $H^+$ derived from water is present. As a result, due to the re-heat treatment, $H^+$ moves inside the glass in a speedy manner to give the electric charge, and each ion of Ti, Nb, W, Bi or so can be efficiently oxidized. Thereby, in the glass according to the present embodiment, the coloring can be significantly reduced by heat treatment of short period of time, and the glass of after the re-heat treatment has an excellent transmittance.

Note that, the infrared light transmit through even the glass with dark color, hence βOH can be evaluated regardless of the presence of the coloring (the presence of the reduced color) of the glass. Also, usually, the re-heat treatment is carried out at the temperature lower than the softening point of the glass, and βOH value of the glass before and after thereof does not substantially change, thus it can be measured at any time before and after the re-heat treatment. Therefore, βOH of the glass can be measured from either of the transparent glass which has gone through the re-heat treatment (the treatment for reducing the color), and the glass with dark color which has not gone through the re-heat treatment.

The glass of the present embodiment is not particularly limited, as long as the above mentioned equation (2) is satisfied, it may be carried out with the re-heat treatment (the treatment to decrease the reduced color), or it may not be carried out with this treatment.

Also, the glass according to the present embodiment has lesser dissolved amount of the noble metal such as platinum or so which is used as the melting container material or the melting apparatus material of the glass. That is, the glass according to the present embodiment has very little amount of the content of the noble metal thereof even in case of including the noble metal.

From the point of reducing the coloring of the glass caused by the noble metal ion, improving the transmittance, reducing the solarization, and reducing the noble metal contaminant or so, the content of the noble metal in the obtained glass is 4 ppm or less. The lower the upper limit of the content of the noble metal is, the more preferable it is, and it is further preferable to have lower upper limit in the order of; 3 ppm, 2.7 ppm, 2.5 ppm, 2.2 ppm, 2.0 ppm, 1.8 ppm, 1.6 ppm, 1.4 ppm, 1.2 ppm, 1.1 ppm, 1.0 ppm, 0.9 ppm. The lower limit of the content of the noble metal is not particularly limited; however 0.001 ppm or so will be included inevitably.

As the noble metal, a metal simple substances such as Pt, Au, Rh, Ir or so, and alloy such as Pt alloy, Au alloy, Rh alloy, Ir alloy or so may be mentioned. As for the melting container material or the melting apparatus material, Pt or Pt alloy is preferable as it has heat resistance and corrosion resistance among the noble metals. Therefore, for the glass produced using the melting container and melting apparatus made of Pt or Pt alloy, the content of Pt comprised in the glass is preferably 4 ppm or less. As for more preferable upper limit of the content of Pt, it is the same as the content of the noble metal included in the glass. Also, the lower limit of the content of Pt is not particularly limited; however 0.001 ppm or so will be included inevitably.

In the below explanation, the example using Pt for the melting container will be used, however it is the same for the case using the noble metals other than Pt as the melting container or so.

The glass according to the present embodiment carries out the procedure to increase the water content in the molten glass during the production steps thereof. Therefore, the oxygen partial pressure in the melting atmosphere is reduced, and the oxidation of the noble metal such as platinum or so which is the material of the melting container (the crucible or so) is prevented. As a result, the oxygen in the melting atmosphere reacts with the platinum material or so, and generated platinum dioxide or the platinum ion ($Pt^{4+}$) is effectively prevented from dissolving; thus the dissolved amount of Pt is reduced in the obtained glass.

Usually, the noble metal ion dissolved in the molten glass absorbs the visible light, hence it has a problem that the coloring increases. However, the glass according to the present embodiment has sufficiently reduced content of Pt as mentioned in the above, thus the coloring caused by Pt ion is less and has excellent transmittance.

Also, the glass according to the present embodiment has excellent transparency. In the production step of the glass (particularly in the melting step), by carrying out the procedure to increase the water content in the molten glass, it is thought that the dissolved gas in the molten gas can be increased. As a result, in the glass according to the present embodiment, due to the excellent transparency, the time required for the refining step can be shortened in the production steps thereof, thus the productivity improves.

The glass according to the present embodiment can be suitably used as the optical glass.

Usually, the optical glass of the high refractive index comprises large amount of the high refractive index components such as Ti, Nb, W, Bi or so as the glass component, thus the coloring (the reduced color) of the glass is demanded to be reduced as mentioned in the above.

The optical glass of the present embodiment can efficiently remove the reduced color by the re-heat treatment even in case of comprising large amount of the high refractive index components as mentioned in above. Also, the optical glass of the present embodiment is drastically reduced with the content of Pt, hence there is only little coloring caused by Pt. Such optical glass according to the present embodiment has high refractive index while having excellent transmittance.

The Production Method of the Glass

Next, as the glass according to the present embodiment, one example of the production method will be explained by referring to FIG. 1 and using the production method of the optical glass as one example.

The production method of the optical glass according to the present embodiment preferably comprises the rough melting step P1 of obtaining the cullet 1 by melting the mixed material, and the re-melting step P2 of obtaining the glass 2 by re-melting said cullet 1; and the procedure to increase the water content in the molten glass is carried out in at least one of said rough melting step or said re-melting step.

Here, the procedure to increase the water content in the molten glass is not particularly limited; however it is preferable to carry out at least the treatment to add the water vapor in the melting atmosphere and the treatment of carrying out the bubbling of the gas comprising the water vapor in the molten material.

Hereinbelow, in accordance with FIG. 1, the example of carrying out the treatment to add the water vapor to the melting atmosphere at both of the rough melting step P1 and the re-melting step P2 will be shown; however the treatment to add the water vapor to the melting atmosphere may not be carried out at either one of the rough melting step P1 and the re-melting step P2.

Note that, if the procedure to increase the water content in the molten glass is not carried out, and the glass is maintained in the melting condition, the water content in the molten glass gradually decreases. Therefore, in order to increase βOH of the obtained glass by solidifying the molten glass, it is preferable to carry out the procedure to increase the water content in the molten glass at the later stage of the glass production step that is at the re-melting step P2, particularly at the later step of the re-melting step P2, that is it is preferable to carry out the procedure to increase the water content in the molten glass at the step of uniforming the molten glass.

Further, as the procedure to increase the water content in the molten glass, in addition to the treatment to add the water vapor in the melting atmosphere, or instead of this treatment, the treatment of bubbling the gas including the water vapor in the molten material may be carried out at either one of or at the both of the rough melting step P1 and re-melting P2.

[The Rough Melting Step P1]

The rough melting step is the step of obtaining the cullet 1 by melting the mixed material.

The rough melting step according to the present embodiment preferably comprises the step s1 of preparing the batch raw material by mixing the raw material, the step s2 of heating and melting said batch raw material, and the step s3 of obtaining the cullet 1 by cooling the molten material.

(The Step s1 of Preparing the Batch Raw Material)

First, the glass raw material, the mixed raw material (the batch raw material) was obtained by scaling and thoroughly mixing the raw material corresponding to the glass component.

As the mixing method, it is not particularly limited, and the known methods can be used. For example, the mixing by using the ball mill or the dry mixer can be mentioned.

As the raw material corresponding to the glass component, it can be suitably selected depending on the glass composition; however oxide raw material, carbonate raw material, nitrate raw material, phosphoric acid raw material, and phosphate raw material or so may be mentioned.

(The step s2 of heating and melting the batch raw material)

Next, the mixed material is placed inside the rough melting container, and then it is heated and melted.

The container and the apparatus used for the rough melting can be suitably selected depending on the composition of the glass to be produced, and for example the container or the apparatus made of noble metal (for example, made of platinum or platinum alloy) or quartz may be used.

For example, in case of phosphate glass including $P_2O_5$, and at least one oxide selected from the group consisting of $TiO_2$, $Nb_2O_5$, $WO_3$ and $Bi_2O_3$, that is comprising the high refractive index component, during the production steps, the melting product material showing significant erosion is produced when the batch raw material is heated and melted. Such melting product material tends to erode the material having excellent corrosion resistance such as platinum or so. Such melting product material tends to erode the material having excellent erosion resistance such as platinum or so. Hence, the noble metal materials such as platinum or so is eroded by the above mentioned melting product material, and dissolve into the molten material and generate contaminant or increase the coloring of the glass.

On the contrary, the flame resistant product such as quartz or so is eroded by the above mentioned melting product material, however even if it gets into the molten material by being eroded, it becomes part of the glass composition; hence it has lesser problem such as in case of noble metal material. Therefore, in case of producing the phosphate glass comprising the high refractive index component, the container and the apparatus used for the rough melting is preferably the container and the apparatus of flame resistant such as quarts or so.

On the other hand, in case of the glass including $B_2O_3$ and at least one oxide selected from the group consisting of $TiO_2$, $Nb_2O_5$, $WO_3$ and $Bi_2O_3$, that is in case of borate glass comprising the high refractive index component, there is less the problem such as the erosion of the noble metal by the molten product material such as in the above mentioned phosphate glass. Therefore, in case of producing the borate glass comprising the above mentioned high refractive index components, the container and the apparatus used for the rough melting is preferably the container or the apparatus made of noble metal such as platinum or platinum alloy which are hardly eroded during the production process of the glass. Note that, in case of the borate glass, the flame resistant container such as quartz or so tends to be eroded significantly.

The melting temperature (rough melting temperature) of the batch raw material during the rough melting is preferably within the range of 800 to 1400° C. Note that the solubility of the dissolved gas declines as the temperature of the molten material increases, hence for increasing the refining effect, the temperature of the molten material during the rough melting step is preferably the same as the melting temperature (the re-melting temperature) of the cullet during the re-melting step, or it is preferably less than the melting temperature of the cullet; and particularly it is preferably lower than the refining temperature during the re-melting step.

Also, the melting time during the rough melting step can be adjusted appropriately by considering the amount introduced into the crucible of the batch raw material and the capacity of crucible, and for example the melting time may be within the range of 0.1 to 20 hours.

The melting atmosphere of the rough melting step is not particularly limited; however from the point of increasing βOH of the glass obtained at the end, it is preferable to add the water vapor to the melting atmosphere.

By adding the water vapor to the melting atmosphere, the value of βOH of the optical glass obtained at the end and the content of the high refractive index component can be regulated to satisfy the predetermined relationship, and also even in case the melting is carried out using the platinum container or the platinum alloy container, the dissolving of Pt or so to the glass can be effectively prevented, and further the dissolved gas can be supplied to the glass sufficient enough to improve the transparency.

The method to add the water vapor to the melting atmosphere is not particularly limited, The method of adding the water vapor in melting atmosphere is not particularly limited, but for example the method of introducing the connecting pipe to the crucible from the opening part provided at the melting device, and depending on the needs, supplying the gas comprising the water vapor through this pipe to the space in the crucible may be mentioned.

The melting of the rough melting step can be carried out with the bubbling in order to make the molten material uniform. The bubbling during the rough melting may be continued after the mixed material has been melted. Also, for making the molten material uniform, the molten material may be stirred by other method than the bubbling.

Note that, the rough melting step is the step to produce the cullet which is the intermediate product; hence it is not a must to make the molten material uniform. The method of making uniform may be selected from the known method suitably depending on the embodiment of the rough melting step.

Also, the gas used for the bubbling is not necessarily limited, and the known gas can be used, and commercially available ones or the ones produced can be used as well.

The gas used for the bubbling is preferably a gas including the water vapor, from the point that the value of βOH of the optical glass obtained at the end and the content of the high refractive index component can be regulated to satisfy the predetermined relationship, and also even in case the melting is carried out using the platinum container or platinum alloy container, the dissolving of Pt or so to the glass can be effectively prevented. Further, from the point that the dissolved gas can be supplied to the glass sufficient enough to improve the transparency; the gas used for the bubbling is preferably the gas including the water vapor.

The content of the water vapor in the gas including water vapor as such is preferably 10 vol % or more, more preferably 20 vol % or more, further preferably 30 vol % or more, even more preferably 40 vol % or more, even further preferably 50 vol %, furthermore preferably 60 vol %, even furthermore preferably 70 vol % or more, particularly preferably 80 vol % or more, and further particularly preferably 90 vol % or more. The higher the content of the water vapor is, the more preferable it is; and particularly by having it within the above mentioned range, the value of βOH of the optical glass obtained at the end and the content of the high refractive index component can be regulated to satisfy the predetermined relationship.

(The Step s3 of Producing the Cullet)

Next, the molten material is rapidly cooled and the cullet is produced.

The method of rapid cooling of the molten material is not particularly limited, and the known methods can be used; for example the method of forming the cullet by dropping the molten material into the water and cool, then solidifying; the method of draining the molten material on to the heat resistant plate, then cooling the molten material and solidifying it followed by pulverizing to produce the cullet or so may be mentioned.

The cullet is made of glass; however it does not have to be a uniform glass. Also, the cullet may comprise bubble. Further, the non-melting material of the batch raw material may be included as well. For the composition and the optical characteristic (for example, the refractive index and Abbe number or so) of the cullet, the glass of uniform and without bubble is formed by re-melting the cullet, and the composition and the optical characteristic of this glass are defined as the composition and the optical characteristic of cullet respectively.

The size of the cullet can be adjusted suitably considering the storage or transportation, or the easiness to handle in the subsequent steps. For example, in case of producing it by dropping the molten material into the water, the dropping amount can be adjusted to control the size. Also, in case of producing it by draining the molten material on the metal plate, the obtained glass can be pulverized to a suitable size thereby it can be adjusted.

Note that, from the point of preventing the separation, the bubbling can be continued while the molten material is draining out from the rough melting container. Further, from the point of increasing the dissolved gas in the cullet and also from the point of increasing βOH of the obtained glass, the bubbling is preferably carried out by the gas including the water vapor.

(The Refractive Index Measurement of the Cullet s4)

Along with the draining of the molten material, a part of the molten material is taken from the rough melting container for molding and use as the glass sample for the refractive index measurement. Then, the refractive index of this glass sample is measured, and the obtained refractive index is defined as the refractive index of the cullet.

The refractive index measurement of the cullet is not necessarily essential step; however by going through such step, it is preferable since the characteristic of the optical glass can be regulated accurately.

[The Re-Melting Step P2]

The rough melting step is the step of obtaining the optical glass 2 by re-melting the cullet 1.

The re-melting step according to the present embodiment comprises preferably the step s5 of mixing said cullet 1, the step s6 of heating and melting said cullet 1, the step s7 of refining the molten glass, the step s8 of uniforming the molten glass, the step s9 of molding the molten material, and the step s10 of gradually cooling.

(The Step s5 of Preparing the Cullet 1)

The cullet is preferably carried out with the refractive index measurement in advance, and in case the measured value of the refractive index is equal to the desired value, the cullet is used as the mixed cullet, and if the measured value of the refractive index does not match the desired value, the mixed cullet is formed by mixing the cullet having the higher refractive index than the desired value and the cullet having the lower value than the desired value.

The cullet of the present embodiment preferably satisfies the above mentioned equation (2), and preferably the cullet has high dissolved gas amount and excellent transparency effect. That is, the cullet is preferably produced by adding the water vapor to the melting atmosphere in the melting step (rough melting step). By using such cullet, for example even in case the water vapor is not added to the melting atmosphere of the re-melting step, the value of βOH of the glass and the content of the high refractive index component can be regulated to satisfy the predetermined relationship, the dissolving amount of Pt or so can be reduced, and further excellent transparency can be exhibited during the refining step.

(The Step s6 of Heating and Melting the Cullet 1)

Next, the mixed cullet is introduced into the re-melting container, and then it is heated and melted.

The container and the apparatus used for the re-melting can be selected suitably depending on the composition of the glass to be produced, and for example the container or the apparatus made of noble metal (for example, made of platinum or platinum alloy) or quartz may be used. Among these, the container and the apparatus made of platinum or platinum alloy are preferable from the point comprising excellent heat resistance and excellent erosion resistance against the melting product material during the melting.

As for the device of carrying out the re-melting step, the re-melting device which carries out melting, refining and uniforming of the mixed cullet in one crucible, and also the re-melting device which comprises plurality of tubs and carries out melting, refining and uniforming in each tub can be used as well.

This device comprises the melting tub for melting the mixed cullet, the refining tub for refining the molten glass obtained by the melting, the processing tub to make the molten glass uniform after the refining and to adjust the viscosity to be suitable for molding, the connecting pipe for flowing the molten glass to the refining tub from the melting tub, the connecting pipe for flowing the molten glass to the processing tub from the refining tub, and the glass draining pipe for draining the molten glass inside the processing tub or so. In this device, one container may be separated by placing a partition to form the melting tub and refining tub.

As for the above mentioned tub, any known ones can be used.

Also, the melting temperature (the re-melting step) of the mixed cullet during the re-melting step is preferably within the range of 800 to 1500° C. Note that, in order to increase the refining effect, it is preferable to make this re-melting temperature lower than the refining temperature. The melting time during the re-melting step can be adjusted appropriately considering the capacity of the crucible, and the amount introduced of the mixed cullet into the crucible. For example, the melting time during re-melting may be within the range of 2 to 20 hours.

The atmosphere during the melting is not particularly limited; however from the point of increasing βOH of the glass obtained at the end, the water vapor is preferably added to the melting atmosphere.

By adding the water vapor to the melting atmosphere, the value of βOH of the optical glass obtained at the end and the content of the high refractive index component can be regulated to satisfy the predetermined relationship, also the dissolving of Pt or so to the glass can be effectively prevented during the production steps of the glass, and the dissolved gas can be supplied to the glass sufficient enough to improve the transparency.

Particularly, for the both steps of the rough melting step and the re-melting step, by adding the water vapor to the melting atmosphere, the value of βOH which has made high at the cullet state can be maintained, and βOH can be made further higher thus the reducing effect of the coloring by the re-heat treatment can be increased. Also, by adding the water vapor to the atmosphere for the entire steps, oxygen can be effectively prevented from reacting with the melting container made of noble metal such as platinum or so, and the dissolved amount of Pt into the glass can be reduced, thus the deterioration of the transmittance can be prevented effectively. Further, the dissolved gas supplied to the cullet state can be maintained until right before the refining step, and the amount of the dissolved gas can be further increased thus the effect of improving the transparency can be enhanced.

The method of adding the water vapor in melting atmosphere is not particularly limited, but for example the method of introducing the connecting pipe to the crucible from the opening part provided at the melting device, and depending on the needs, supplying the water vapor through this pipe to the space in the crucible may be mentioned.

The flow amount of the gas comprising the water vapor to be supplied into the space of the crucible is not particularly limited, and it can be controlled based on the measured result of βOH of the glass which is produced experimentally. For example, in case of supplying the water vapor in the melting container roughly sealed, the glass having the desired βOH can be obtained by just supplying relatively small amount of water vapor. On the other hand, in case of melting the glass by placing the crucible without the lid in the glass melting furnace, the volume inside the glass melting furnace becomes larger compared to the volume inside the crucible, thus in order to have desired βOH value, relatively large amount of the water vapor will be supplied into the glass melting furnace. Based on such experiment result, the supplying amount of the water vapor; that is by feeding back the flow amount of the gas to the next production, the glass having desired βOH value can be produced. Note that, hereinafter, the flow amount of the gas, the flow amount of the water vapor, the atmospheric adding flow amount, the supplying amount of the water vapor are the value converted in 25° C. and 1 atmospheric pressure.

The melting during the re-melting step is preferably carried out with the bubbling in order to make the molten material uniform. The bubbling during the re-melting is preferably continued after the mixed cullet has been melted.

Note that, in case of not carrying out the bubbling, preferably the molten material is stirred and made uniform by other stirring methods. As for other stirring method, the known methods can be used and for example by stirring with the stirring rod or so may be mentioned.

Also, the gas used for the bubbling is not necessarily limited, thus the known gas can be used, and commercially available ones or the one generated can be used.

The gas used for the bubbling is preferably a gas including the water vapor, from the point that the value of βOH of the optical glass obtained at the end and the content of the high refractive index component can be regulated to satisfy the predetermined relationship, and also the dissolving of Pt or so to the glass can be effectively prevented. Further, from the point that the dissolved gas can be supplied to the glass sufficient enough to improve the transparency; the gas used for the bubbling is preferably the gas including the water vapor.

The flow amount of the gas comprising the water vapor which is introduced into the molten material is not particularly limited, and it may be regulated based on the measured result of βOH of the glass which is produced experimentally. For example, when βOH of the glass produced experimentally is measured and if the measured result is smaller than the desired value, the flow amount of the gas is increased; on the other hand, if the measured result is larger than the desired βOH value, the flow amount of the gas is regulated to reduce the amount. As such, the flow amount of the gas can be regulated from the measured result obtained by βOH of the glass produced experimentally. As such, based on the measurement result of βOH of the glass produced experimentally, the supplying amount of the water vapor, that is the flow amount of the gas is feed backed to the subsequent production, thereby the glass having the desired βOH can be produced.

The content of the water vapor in the gas comprising such water vapor is preferably 10 vol % or more, more preferably 20 vol % or more, further preferably 30 vol % or more, even more preferably 40 vol % or more, even further preferably 50 vol %, furthermore preferably 60 vol %, even furthermore preferably 70 vol % or more, particularly preferably 80 vol % or more, and further particularly preferably 90 vol % or more. The higher the content of the water vapor is, the more preferable it is; and by setting within the above mentioned range, the value of βOH of the optical glass obtained at the end and the content of the high refractive index component can be regulated to satisfy the predetermined relationship.

(The Refining Step s7 of the Molten Glass)

Once the cullet is completely melt and uniform molten glass is obtained, if the bubbling is carried out then the bubbling is terminated, then the temperature of the molten glass is raised for the refining.

The refining temperature, that is, the temperature of the molten glass during the refining step is preferably 900 to 1500° C. Note that, in order to further enhance the refining effect, the refining temperature is preferably higher than the temperature at the rough melting step and the re-melting step. The refining time can be set so that the bubble remaining in the glass becomes less than the predetermined amount and also the coloring of the glass becomes less than the predetermined value. It is effective to make the refining time longer for enhancing the defoaming effect; however the molten glass will be maintained in the crucible made of platinum or platinum alloy for long period of time under high temperature, thus the coloring of the glass may increase as platinum dissolves into the molten glass, and the platinum contaminant tends to easily enter to the glass.

Therefore, the refining time is made short within the range that the sufficient bubble removal can be obtained, and to suppress the coloring of the glass. For example, the refining time may be within the range of 1 to 10 hours.

(The Uniforming Step s8 of the Molten Glass)

After removing the bubble in the molten glass to the outside thereof by the refining, the temperature of the molten glass is lowered, and the molten glass is uniformed by stirring.

The molten glass is uniformed by decreasing the temperature of the molten glass lower than the temperature of the refining temperature. During the uniforming step, the molten glass is made uniform by stirring. Not only the molten glass is made uniform during the uniforming step, it is the step to adjust the viscosity so that it is suitable for molding the molten glass. The uniforming time is adjusted accordingly so that the striae is gone or is less by observing the presence of the striae of the molded glass, and so that the viscosity of the molten glass is suitable for the molding.

(The Molding Step S9)

The molten glass being refined and uniformed is drained out from the glass draining pipe installed to the bottom part of the re-melting container, and then molds the glass by introducing into the mold.

The temperature of the glass draining pipe is within the temperature range that does not make the flowing molten glass devitrify, and it is adjusted and maintained so that the viscosity is suitable for the molding.

In the method of carrying out melting, refining and uniforming of the raw material in one crucible, a part of the glass draining pipe is cooled so that the glass inside is solidified, then the pipe is closed to carry out each step of melting, refining and uniforming. Then, part being cooled of the pipe is heated to melt the glass, and then the pipe is opened to drain the molten glass. The temperature regulation of the glass draining pipe may be done by known methods.

The molding of the molten glass may be carried out by known methods. For example, the molten glass is drained into the mold for molding. Alternatively, the molten glass bulk is separated from the molten glass and press-molded. Alternatively, the molten glass bulk is separated from the molten glass and it is molded while floating by applying the gas pressure.

(The Gradual Cooling Step s10)

Next, the molded glass is cooled gradually, then re-heating treatment is carried out to remove the coloring and strain, and also the refractive index is adjusted finely thereby the optical glass of object is obtained.

The gradual cooling of the molded glass may be carried out by known methods. For example, the molded glass may be maintained at the temperature near the glass transition temperature, and then gradually cooled by the predetermined temperature decreasing speed. The predetermined temperature decreasing speed differs depending on the glass composition, however for example it can be 0.1 to 100° C./hour.

The re-heating treatment is preferably carried out in the oxidizing atmosphere. Thereby, the coloring of the optical glass can be made small.

The glass obtained as such has extremely small content of noble metal such as Pt derived from the production apparatus such as the melting container or so. Therefore, the coloring of the glass due to the ultraviolet ray so called solarization is little. As a result, the optical element using the above mentioned glass has little change of the transmittance over the time. Also, when fixing the optical element by using an ultraviolet ray curable adhesive agent, it is possible to obtain the effect of which the transmittance does not decline even after the ultraviolet ray is irradiated to the optical element.

As for the gas used in the oxidizing atmosphere, it only needs to be a gas with oxygen, and the oxygen concentration is for example about the same of air or may be higher. As for such oxidizing atmosphere gas, for example oxygen, air and the mixed gas thereof may be used. The heat treating temperature is preferably lower than the softening point of the glass, and higher than the temperature lower by 100° C. from the glass transition temperature (Tg−100° C.).

Note that, when the coloring of the glass is reduced to a predetermined level, the heat treating time can be shortened if the heat treating temperature is high. Also, the heat treating time can be shortened by increasing the oxygen partial pressure in the oxidizing atmosphere. The heat treating time as such changes depending on the heat treating temperature and the oxygen partial pressure in the oxidizing atmosphere; however it can be set so that the coloring of the glass is at the desired level. The heat treating time is typically 0.1 hour to 100 hours preferably.

Regarding the Glass Composition

Hereinafter, unless mentioned otherwise, the content of the glass component, total content, the content of the additive will be expressed in mol % in terms of oxides.

The glass according to the present embodiment comprises at least one oxide selected from $TiO_2$, $Nb_2O_5$, $WO_3$ and $Bi_2O_3$ (hereinafter, it may be simply referred as "high refractive index component") as the glass component. Preferably, the total content of $TiO_2$, $Nb_2O_5$, $WO_3$ and $Bi_2O_3$ included in the glass is 20% or more, more preferably 25% or more, further preferably 30% or more, and even further preferably 35% or more. If the total content of $TiO_2$, $Nb_2O_5$, $WO_3$ and $Bi_2O_3$ exceeds 85%, then the devitrification resistance tends to deteriorate, thus from the point to maintain the devitrification resistance, the total content of $TiO_2$, $Nb_2O_5$, $WO_3$ and $Bi_2O_3$ is preferably 85% or less, more preferably 80% or less, and further preferably 75% or less.

From the point of increasing the content of $TiO_2$, $Nb_2O_5$, $WO_3$ and $Bi_2O_3$ in the glass, in the production method of the present embodiment, the obtained glass is preferably $P_2O_5$ containing glass. In $P_2O_5$ containing glass, the moving speed of $H^+$ during the heat treatment is fast, thus the coloring can be reduced by the heat treatment of short time compared to other composition type.

As for such glass, the glass wherein the content of $P_2O_5$ is larger than the content of $SiO_2$ and is larger than the content of $B_2O_3$; and the glass wherein the content of $P_2O_5$ is larger than the total content of $SiO_2$ and $B_2O_3$ in terms of mol % expression, may be mentioned.

The present embodiment can be used for the glass composition comprising the known composition wherein the content of $TiO_2$, $Nb_2O_5$, $WO_3$ and $Bi_2O_3$ are within the above mentioned range, in addition to the composition shown in the examples.

Next, the preferable glass composition of the present embodiment will be explained.

$P_2O_5$ is the glass network forming component, and it has the function to maintain the thermal stability of the glass. If the content of $P_2O_5$ is less than 7%, the thermal stability tends to decline, thus preferably the content of $P_2O_5$ is 7% or more. If the content of $P_2O_5$ is larger than 40%, the refractive index declines. Therefore, the content of $P_2O_5$ is preferably within 7 to 40%. The lower limit of the content of $P_2O_5$ is 10%, more preferable lower limit is 12%, further preferable lower limit is 15%, and even more preferable lower limit is 18%. The preferable upper limit of the content of $P_2O_5$ is 35%, more preferable upper limit is 33%, further preferable upper limit is 30%, and even more preferable upper limit is 28%.

$SiO_2$ is difficult to be dissolved into the glass of $P_2O_5$ based composition, and if it is introduced in a large amount, then undissolved residue will be generated hence the uniformity of the glass tends to be deteriorated. Therefore, the content of $SiO_2$ is preferably less than the content (M) of $P_2O_5$. As for the relationship between the content of $SiO_2$ and the above mentioned M (the content (%) of $P_2O_5$), the more preferable content of $SiO_2$ is 0% to 0.8×M [%], and further preferable range is 0% to 0.5×M [%], even preferable range is 0% to 0.3×M [%], and even more preferable range is 0% to 0.15×M [%].

$B_2O_3$ function to improve the devitrification resistance by just comprising a small amount. As for the relationship between the content of $B_2O_3$ and the above mentioned M (the content (%) of $P_2O_5$), the preferable content range of $B_2O_3$ is 0% or more and less than M [%], more preferable range is 0% to 0.9×M [%], further preferable range is 0% to 0.7×M [%], even preferable range is 0% to 0.6×M [%], even more preferable range is 0% to 0.5×M [%], even further preferable range is 0% to 0.4×M [%], and still even more preferable range is 0% to 0.35×M [%].

$TiO_2$, $Nb_2O_5$, $WO_3$ and $Bi_2O_3$ increases the refractive index, also functions to increase the dispersion, and are components functions to improve the chemical durability. However, if the contents of $TiO_2$, $Nb_2O_5$, $WO_3$ and $Bi_2O_3$ respectively become large, the devitrification resistance tends to deteriorate.

From the point of maintaining the devitrification resistance, the upper limit of the content of $TiO_2$ is 40%, more preferable upper limit is 35%, further preferable upper limit is 33%, and even more preferable upper limit is 30%. From the point of obtaining introduction effect of $TiO_2$, the preferable lower limit of the content of $TiO_2$ is 1%, and more preferable lower limit is 3%. The content of $TiO_2$ can be 0% as well.

From the point of maintaining the devitrification resistance, the preferable upper limit of the content of $Nb_2O_5$ is 45%, more preferable upper limit is 40%, and more preferable upper limit is 35%. From the point of obtaining the introduction effect of $Nb_2O_5$, the preferable lower limit of the content of $Nb_2O_5$ is 5%, more preferable lower limit is 8%, and further preferable lower limit is 11%. The content of $Nb_2O_5$ can be 0% as well.

The preferable range of the content of $WO_3$ is 0 to 30%. From the point of obtaining the introduction effect of the above mentioned $WO_3$, the preferable lower limit of the content of $WO_3$ is 1%, more preferable lower limit is 3%, and further preferable lower limit is 5%. On the other hand, from the point of obtaining the devitrification resistance, the preferable upper limit of the content of $WO_3$ is 27%, more preferable upper limit is 24%, further preferable upper limit is 20%, and even more preferable upper limit is 18%. The content of $WO_3$ can be 0% as well.

The preferable range of the content of $Bi_2O_3$ is 0 to 35%. From the point of obtaining the introduction effect of the above mentioned $Bi_2O_3$, the preferable lower limit of the content of $Bi_2O_3$ is 1%, more preferable lower limit is 3%, and further preferable lower limit is 5%. On the other hand, from the point of obtaining the devitrification resistance, the preferable upper limit of the content of $Bi_2O_3$ is 30%, more preferable upper limit is 28%, and further preferable upper limit is 24%. The content of $Bi_2O_3$ can be 0% as well.

The divalent metal components such as BaO, SrO, CaO, MgO and ZnO or so functions to improve the melting property of the glass, and to reduce the coloring of the glass. Also, if it is an appropriate amount, it functions to improve the devitrification resistance. However, if excessive amount is comprised, the refractive index declines and the devitrification resistance tends to deteriorate; thus the total content of BaO, SrO, CaO, MgO and ZnO is preferably 0 to 40%, and more preferably 0 to 32%. The preferable upper limit of the total content of BaO, SrO, CaO, MgO and ZnO is 30%, more preferable upper limit is 27%, and further preferable upper limit is 25%. The preferable lower limit of the total content of BaO, SrO, CaO, MgO and ZnO is 0.1%, more preferable amount is 0.5%, and further preferable lower limit is 1%.

Among these divalent metal components, the content of BaO is preferably within the range of 0 to 40%, and more preferably within 0 to 32% since BaO is an effective component to maintain the high refractive index. The preferable upper limit of the content of BaO is 30%, more preferable upper limit is 27%, and further preferable upper limit is 25%. The preferable lower limit of the content of BaO is 0.1%, more preferable lower limit is 0.5% and further preferable lower limit is 1%. The content of BaO can be 0% as well.

The alkali metal oxides such as $Li_2O$, $Na_2O$ and $K_2O$ or so functions to improve the melting property of the glass, and reduces the coloring of the glass. Also, it functions to reduce the glass transition temperature and the softening temperature, and functions to lower the heat treating temperature of the glass as well. However, if excessive amount is comprised, the refractive index declines, and the devitrification resistance tends to deteriorate, hence the total content of $Li_2O$, $Na_2O$ and $K_2O$ is preferably 0 to 40%, more preferably 0 to 35%, further preferably 0 to 32%, and even more preferably 0 to 30%. The content of $Li_2O$, $Na_2O$ and $K_2O$ can be 0% as well. Particularly, in case of using $Li_2O$ as the alkali metal oxide, from the point of obtaining the high refractive index glass, the content thereof in the produced glass is more than 0% and less than 10%, more preferably more than 0% and 9% or less, and particularly preferably more than 0% and 8% or less.

$Al_2O_3$ function to improve the devitrification resistance if it is a small amount, however if excessive amount is comprised, then the refractive index declines. Therefore, the preferable range of the content of $Al_2O_3$ is 0 to 12%, more preferable range is 0 to 7%, and further preferable range is 0 to 3%.

$ZrO_2$ function to enhance the refractive index, and if it is a small amount, it functions to improve the devitrification resistance. However, excessive amount is comprised, the devitrification resistance and the melting property tends to deteriorate; thus the preferable range of the content of $ZrO_2$ is 0 to 16%, more preferable range is 0 to 12%, further preferable range is 0 to 7%, and even more preferable range is 0 to 3%.

$GeO_2$ function to maintain the devitrification resistance, and to enhance the refractive index. Also, although $GeO_2$ function to enhance the refractive index, unlike $TiO_2$, $Nb_2O_5$, $WO_3$ and $Bi_2O_3$, it does not increase the coloring of the glass. However, it is extremely expensive component compared to other components, thus the lesser the content of $GeO_2$ is, the better it is from the point of reducing the production cost of the glass. Therefore, in order to widely spread the high refractive index glass product, it is demanded to provide the refractive glass with excellent transmittance while reducing the content of $GeO_2$. According to the present embodiment, by having 20% or more of the total content of $TiO_2$, $Nb_2O_5$, $WO_3$ and $Bi_2O_3$, a high refractive index glass with excellent transmittance can be provided without using large amount of $GeO_2$.

From the point of as such, the preferable range of the content of $GeO_2$. is 0 to 10%, more preferable range is 0 to 5%, further preferable range is 0 to 3%, even more preferable range is 0 to 2%, even further preferable range is 0 to 1%, and even furthermore preferable range is 0 to 0.5%; and $GeO_2$ may not be comprised. Note that, if the production cost is not to be concerned, it can be suitably used in an effective amount.

$TeO_2$ maintain the devitrification resistance while functioning to improve the refractive index. However, from the point of an environmental concern, the preferable range of the content of $TeO_2$ is 0 to 10%, more preferable range is 0 to 5%, further preferable range is 0 to 3%, even more preferable range is 0 to 2%, even further preferable range is 0 to 1%, and even furthermore preferable range is 0 to 0.5%; and $TeO_2$ may not be comprised.

$Sb_2O_3$ has oxidizing effect, and it function to suppress the reduction of $TiO_2$, $Nb_2O_5$, $WO_3$ and $Bi_2O_3$. However, $Sb_2O_3$ itself has an absorption in the visible range, and facilitate the dissolving of the noble metal ions to the molten glass by oxidizing the melting container made of noble metal due to this oxidizing effect. Therefore, the preferable range of the content of $Sb_2O_3$ is 0 ppm or more and less than 1000 ppm. From the above mentioned point of view, the upper limit of the content of $Sb_2O_3$ is 900 ppm, 800 ppm, 700 ppm, 600 ppm, 500 ppm, 400 ppm, 300 ppm, 200 ppm, 100 ppm in this order, and the smaller the value is the more preferable it is. $Sb_2O_3$ may not be comprised.

If the component other than the above mentioned components is comprised in a large amount, the devitrificaton resistance of the glass deteriorates, and the liquidus temperature tends to increase. Therefore, the glass melting temperature must be increased, and an erosion of the melting container made of noble metal increases, thus the amount of the noble metal dissolving into the glass increases. Also, the reduced color of $TiO_2$, $Nb_2O_5$, $WO_3$ and $Bi_2O_3$ increases as well.

From the point of suppressing the increase of such noble metal amount and to suppress the coloring of the glass, the total amount of $P_2O_5$, $SiO_2$, $B_2O_3$, $TiO_2$, $Nb_2O_5$, $WO_3$ and $Bi_2O_3$, MgO, CaO, SrO, BaO, ZnO, $Li_2O$, $Na_2O$, $K_2O$, $Al_2O_3$, $ZrO_2$, $GeO_2$, $TeO_2$ and $Sb_2O_3$ are preferably 90% or more, more preferably 92% or more, further preferably 95% or more, even more preferably 96% or more, even further preferably 97% or more, still more preferably 98% or more, and yet more preferably more than 99%. Note that, the total content of the above mentioned may be 100%.

$Ta_2O_5$, $Y_2O_3$, $La_2O_3$, $Gd_2O_3$, $Yb_2O_3$, $In_2O_3$, $Ga_2O_3$, $SnO_2$, $CeO_2$ and F or so may be comprised in a small amount. The total content of $Ta_2O_5$, $Y_2O_3$, $La_2O_3$, $Gd_2O_3$, $Yb_2O_3$, $In_2O_3$, $Ga_2O_3$ and F is preferably 0 to 10%, more preferably 0 to 7%, further preferably 0 to 5%, even more preferably 0 to 3%, even further preferably 0 to 1%, and still more preferably 0 to 0.5%.

F is a component which should not be included in a large amount from the point of increasing the volatility of the molten glass to obtain a uniform glass, and to obtain the glass comprising the stable optical characteristic. The preferable range of the content of F is 0 to 3%, more preferable range is 0 to 1%, further preferable range is 0 to 0.5%; and it is even more preferable to be substantially free of F.

From the point of reducing the environmental load, it is preferable to substantially be free of Pb, As, Cd, U, Th and Tl.

From the point of reducing the coloring of the glass, it is preferably substantially free of the additives and the components which have absorbance in the visible range such as Cu, Cr, Mn, Fe, Co, Ni, V, Mo, Nd, Eu, Er, Tb, Ho, Pr or so.

However, in the glass production method of the present embodiment, the inevitable impurities are not excluded.

Note that, as the glass raw material, depending on the glass components, the known glass raw material can be used such as oxides, phosphoric acid, phosphates (polyphosphate, metaphosphate, pyrophosphate or so), boric acid, boric anhydride, carbonates, nitrates, sulfates, hydroxides or so.

The Production of the Optical Element

In order to make the optical element by using the optical glass of the above, the known methods can be used. For example, the molten glass is molded to produce the glass material for press-molding. Next, this glass material is re-heated, and press molded to produce the optical element blank. Further, the optical element is produced by processing by the step including the polishing of the optical element blank.

Alternatively, the molten glass is molded to produce the glass material for press-molding, and this glass material is heated and the precision press-molding is carried out to produce the optical element.

In the above mentioned each step, the molten glass is molded to produce the glass mold product, and the glass mold product is processed to produce the glass material for press-molding.

Alternatively, the molten glass is molded to produce the glass mold product, and this glass mold product is processed to produce the optical element.

To the optical function face of the produced optical element, anti-reflection film, total reflection film or so may be coated depending on the purpose of the use.

As for the optical element, various lenses such as spherical lenses, macro lenses, lens array or so, prism, diffraction gratings or so may be mentioned as examples.

Hereinabove, the embodiment of the present invention has been described, however the present invention is not to be limited thereto; and various embodiments can be carried out within the scope of the present invention which does not exceed the gist of the present invention.

For example, in the present embodiment, the production of the glass by the rough melting—re-melting method has been described; however the known methods can be employed such as the method of obtaining the glass by heating, melting and molding the batch raw material (the batch direct melting method) or so.

Also, in the present embodiment, as the method to increase βOH of the glass, the method of adding the water vapor to the melting atmosphere has been mainly described; however the method of bubbling the gas including the water vapor to the molten material, or the method of using the compound including the water as the glass raw material or so may be mentioned. These methods may be combined for used.

Note that, in case of the method of increasing the water content in the molten glass by using the compound (for example orthophosphoric acid or boric acid or so) including the water as the glass raw material, the water transpires from the molten glass, hence it is difficult to sufficiently increase βOH of the glass by this method alone. Therefore, the method of using the compound including the water as the glass raw material, it is preferable to use together with above mentioned other methods.

Also, the glass according to the present embodiment is suitable as the material for the optical element, thus it is preferably an amorphous glass. As the method of producing the optical element made of glass, for example the method of heating, softening and molding the glass material may be mentioned. The crystalline glass wherein the crystalline phase is dispersed in the vitreosity is not suitable for the molding method of the above mentioned. Also, the crystalline phase of the crystalline glass scatters the light, and it may lower the performance as the optical element. As for the amorphous glass, there is no such problem.

Also, in the embodiment of the present invention, the optical glass is used as the example, however as long as it is a glass product of which the coloring due to the reducing component causes problem, it can be suitably used for the production of various glass product not only for the optical elements. As for such glass product, for example, optical window material, solar battery glass, cover glass or so may be mentioned.

Also, the present embodiment mentions the method of melting the raw material using mainly the crucible as one example for the production of the optical glass, however as for the melting container, the tube made of quartz or so and with opened both ends or so may be used.

Specifically, in the glass melting furnace, the tube made of quartz is fixed by being inclined. At the bottom part of the glass melting furnace, the opening part is provided to the position corresponding to the lower part of the opening end of the lower position side of the tube. The raw material (the batch raw material or the cullet) is introduced into the tube from the opening end of the higher position side of the tube, then melt (or dissolve) inside the tube, thereby forms the molten material. The molten material slowly flows inside of the tube, and flows out from the opening side of the lower position side of the tube.

For example in case of using the above mentioned tubes or so, during the rough melting step, the draining product passes through the opening part of the bottom of the furnace, and is dropped in to the water of the water tank placed in advance at the lower side of the opening part of the bottom part of the glass melting furnace, thereby forms the cullet.

In the above mentioned method, the raw material is melted using the tube made of the quartz, however instead of the tube, the crucible made of quarts or so may be used as well. First, the raw material is placed inside the crucible made of quartz, and heated and melted to form the molten material, then the molten material may be casted in the water, or drained out on to the heat resistance board which has been cooled thereby the cullet may be produced.

Next, other embodiment of glass with high water content as the modified example of the above mentioned main embodiment will be shown in below.

The Embodiment According to the First Modified Example

The present embodiment is about the same as the above mentioned embodiment except that the equation to determine the lower limit of βOH of the glass differs as shown in below, and the overlapping description will be omitted in below.

In the present embodiment, the main objects are to reduce the dissolving of the noble metal into the molten glass and to improve the transparency. The glass according to such embodiment has the refractive index nd of 1.75 or more, and the value of βOH shown in the below equation (1) satisfies the relation shown in the below equation (6).

$$\beta OH = -[\ln(B/A)]/t \qquad (1)$$

$$\beta OH \geq 181.39 \times nd^{-3} - 325.75 \times nd^{-2} + 194.85 \times nd^{-1} - 38.1 \qquad (6)$$

"t" is as mentioned in above, the thickness (mm) of the glass used for the measurement of the external transmittance. The unit of βOH is $mm^{-1}$. In the equation (6), "nd" is the refractive index of said glass at the wavelength 587.56 nm (d-line of the yellow helium). The refractive index nd of the glass according to the present embodiment is 1.75 or more. Also, the lower limit of the refractive index nd is preferably 1.80, more preferably 1.85, and further preferably 1.90. Also, the upper limit of the refractive index nd is not particularly limited as long as the glass is obtained, and for example it can be 2.5 or so. By using the optical element made of glass with high refractive index and constituting the optical system, the optical system becomes more compact and show higher performance. From such point of view, the higher the refractive index nd is, the more preferable it is. However, as the refractive index becomes higher, the devitrification resistance tends to decline. Therefore, from the point of maintaining the devitrification resistance, the upper limit of the refractive index nd is preferably 2.4, and more preferably 2.3.

Also, in the glass according to the present embodiment, the value of βOH shown in the below equation (1) satisfies the relation shown in the below equation (7), and more preferably it satisfies the relation shown in below equation (8).

$$\beta OH \geq 181.39 \times nd^{-3} - 325.75 \times nd^{-2} + 194.85 \times nd^{-1} - 38.05 \quad (7)$$

$$\beta OH \geq 181.39 \times nd^{-3} - 325.75 \times nd^{-2} + 194.85 \times nd^{-1} - 38.00 \quad (8)$$

Also, the upper limit of βOH differs depending on the type of the glass and the production condition or so, and it is not particularly limited as long as it can be adjusted. If βOH is increased, the amount of the volatile product from the molten glass tends to increase, hence from the point of suppressing the volatilization from the molten glass, βOH is 10 $mm^{-1}$ or less, preferably 8 $mm^{-1}$ or less, more preferably 6 $mm^{-1}$ or less, even preferably 5 $mm^{-1}$ or less, even further preferably 4 $mm^{-1}$ or less, even more preferably 3 $mm^{-1}$ or less, and still even further preferably 2 $mm^{-1}$ or less.

In the glass according to the present embodiment, the value of βOH satisfies the relation shown in the above mentioned equation (6). That is, the glass according to the present embodiment has higher concentration of water in the glass compared to the glass produced by the usual production method. This is because the glass according to the present embodiment has been actively taking in the water to the glass by the procedure to increase the water content in the molten glass during the production steps thereof. Here, as the procedure to increase the water content in the molten glass, for example the treatment to add the water vapor to the melting atmosphere, or the treatment of bubbling the gas including the water vapor in the molten material or so may be mentioned.

Also, for the melting of the glass as mentioned in the above, in general, the melting container produced by the noble metals such as platinum, gold, rhodium, iridium or so, or the alloy of these noble metals are used; however, these noble metal materials dissolve into the molten material when melting the glass, and causes the solarization or the coloring of the glass.

The glass according to the present embodiment has little dissolving amount of the noble metal even in case the noble metal such a platinum or so is used as the melting container or the melting apparatus. That is, the glass according to the present embodiment has significantly little content of the noble metal even in case noble metals are included.

From the point of reducing the coloring of the glass caused by the noble metal ion, improving the transmittance, reducing the solarization, and reducing the noble metal contaminant or so, the content of the noble metal in the obtained glass is 4 ppm or less. The lower the upper limit of the content of the noble metal is, the more preferable it is, and it is further preferable to have lower upper limit in the order of 3 ppm, 2.7 ppm, 2.5 ppm, 2.2 ppm, 2.0 ppm, 1.8 ppm, 1.6 ppm, 1.4 ppm, 1.2 ppm, 1.1 ppm, 1.0 ppm, 0.9 ppm. The lower limit of the content of the noble metal is not particularly limited; however 0.001 ppm or so will be included inevitably.

As the noble metal, a metal simple substances such as Pt, Au, Rh, Ir or so, and alloy such as Pt alloy, Au alloy, Rh alloy, Ir alloy or so may be mentioned. As for the melting container material or the melting apparatus material, Pt or Pt alloy is preferable as it has heat resistance and corrosion resistance among the noble metals. Therefore, for the glass produced using the melting container and melting apparatus made of Pt or Pt alloy, the content of Pt comprised in the glass is preferably 4 ppm or less. As for more preferable upper limit of the content of Pt, it is the same as the further preferable content of the noble metal included in the glass. Also, the lower limit of the content of Pt is not particularly limited; however 0.001 ppm or so will be included inevitably.

Hereinafter, the example wherein the melting container is platinum (Pt) will be used for explanation, however same applies to even when the melting container made of metal material other than noble metal such as platinum.

The glass according to the present embodiment has been carried out with the procedure to increase the water content in the molten glass during the production steps thereof. When such treatment is carried out during the production steps of the glass, the oxygen partial pressure in the melting atmosphere is reduced, and the oxidation of the noble metal material such as platinum or so which is the material of the melting container (the crucible or so) is prevented.

As a result, platinum dioxide or platinum ion ($Pt^{4+}$), produced due to the reaction between oxygen and the platinum material or so under the melting atmosphere can be effectively prevented, from dissolving into the molten material (glass); and the dissolved amount of Pt in the obtained glass can be reduced even more.

Usually, the noble metal ion dissolved in the molten glass absorbs the visible light, thus the coloring of the glass increases which is a problem. However, the glass according to the present embodiment is sufficiently reduced with the content of Pt as mentioned in the above, thus the coloring derived from Pt ion is little and has excellent transmittance.

Also, the glass according to the present embodiment has excellent transparency. Therefore, the time needed for the refining step can be shortened, thus the production cost can be reduced significantly.

Generally, the transparency of the glass depends on the amount of the dissolved gas in the molten glass. Such dissolved gas amount is largely influenced by the composition of the glass (particularly of the type of the raw material), and the melting time and the melting number. However, if the dissolved gas can be supplemented during the melting step, the problem of the transparency can be solved.

The glass according to the present embodiment has actively taken in the water to the glass by the procedure to increase the water content in the molten glass during the production steps thereof. As a result, the dissolved gas as the water vapor in the molten glass can be supplemented, and the transparency of the glass can be improved.

The glass according to such embodiment, as mentioned in above, has been carried out with the procedure to increase the water content in the molten glass during the production steps. The glass according to the present embodiment which has gone through such treatment takes in the water to the molten glass during the melting step thereof, thus it has higher concentration of water and higher βox in the glass compared to the glass with the same composition produced by the usual production method.

Thereby, the present inventors have speculated that by carrying out the treatment to increase βOH to the obtained glass, the dissolving of Pt can be reduced and the transparency can be improved.

The method to increase βOH of the glass is not particularly limited; however preferably the procedure to increase the water content in the molten glass during the melting step may be mentioned. Here, as the procedure to increase the water content in the molten glass, for example the treatment to add the water vapor in the melting atmosphere, or the treatment to bubble the gas including the water vapor in the molten material or so may be mentioned.

Usually, according to these methods, the water can be introduced in the glass, and βOH can be increased, however the increasing rate thereof differs depending on the glass. As a result of keen examination by the present inventors, it was found that the easiness to take the water into the glass depends on the refractive index nd of the glass. That is, the larger the refractive index nd of the glass is, the more difficult the water is to be taken in.

Therefore, for example, the glass with relatively low refractive index nd easily takes in the water, and by carrying out the procedure to increase βOH as mentioned in the above, βOH of the glass can be improved significantly. However, the glass with relatively high refractive index nd scarcely take in the water, thus even if the treatment is carried out under the same condition, it is difficult to increase the value of βOH to the same level as the glass having the high refractive index, thus βOH of the obtained glass becomes low.

As such, the easiness to take the water into the glass differs depending on the refractive index nd of the glass. Therefore, the present invention has defined the above equation (6) and determined the lower limit of βOH depending on the glass composition.

Here, in the above mentioned equation (6), "nd" refers to the refractive index of the glass.

As discussed in above, there is a glass which easily takes the water in depending on the refractive index nd of the glass, and those which are not. As a result of keen examinations, the present inventors have found that as the higher the refractive index nd of the glass is, the water tends to be difficult to be taken in, thereby the above mentioned equation (6) is determined.

Such equation (6) differentiates whether the glass has been carried out with the treatment to increase βOH during the production steps thereof. That is, during the glass production steps thereof, the glass which is not carried out with the treatment to increase βOH (the glass produced by the conventional production method) does not satisfy the above mentioned equation (6).

As the components to increase the refractive index nd of the glass, for example, the high refractive index components such as Ti, Nb, W, Bi or so may be mentioned, however in the glass comprising these high refractive index in a large amount, usually these high refractive index components are reduced during the melting of the glass, and the light at the short wavelength side of the visible light range is absorbed, hence the coloring in the obtained glass may increase in some cases.

The coloring of such glass (hereinafter, it may be referred as the reduced color) is reduced by carrying out the re-heating treatment under the oxidizing atmosphere. This is thought because the high refractive index component at the reduced condition is carried out with the re-heating treatment under the oxidizing atmosphere, and due to the oxidation, the visible light absorption of each ion is weakened.

Particularly, in order to reduce the coloring in short period of time, it is necessary to make the speed of oxidizing the reduced high refractive index component at the heat treating faster, and to do so, it is necessary to have ions which can oxidize reduced high refractive index components by moving inside the glass in a speedy manner and give the electric charge. As for such ion, $H^+$ is thought to suitable.

Here, the glass according to the present embodiment satisfies the above mentioned equation (6). That is, sufficient water is introduced in the glass, and $H^+$ derived from the water is present in a large amount. As a result, due to the re-heating treatment, $H^+$ moves inside the glass in a speedy manner and give the electric charge, thus each ion of the reduced high refractive index component can be efficiently oxidized. Thereby, in the glass according to the present embodiment, the coloring can be significantly reduced by the heat treatment of the short period of time, and the glass after the re-heating treatment has excellent transmittance.

Note that, since the infrared light transmit through even a dark colored glass, thus βOH can be evaluated regardless of the coloring of the glass. Also, usually, since the re-heating treatment is carried out under a lower temperature than the softening point of the glass, the value of βOH of the glass does not substantially change before and after thereof, thus it may be measured any time before and after the re-heating treatment. Therefore, βOH of the glass can be measured by any of the transparent glass after the re-heating treatment (the treatment to reduce the coloring) and the glass with dark color which has not gone through the re-heating treatment.

The glass of the present embodiment is not particularly limited as long as the above mentioned equation (6) is satisfied, and the treatment to decrease the reduced color may be carried out, or it may not be carried out with this treatment.

Also, the glass according to the present embodiment can be suitably used for the optical glass.

Usually, for the optical glass, an excellent transmittance and the transparency are demanded. In this regard, the optical glass of the present embodiment has the content of Pt which is significantly reduced, thus the coloring derived from Pt is extremely little, and has excellent transmittance, while the dissolved gas amount in the molten glass is increased and has excellent transmittance, further the glass of uniform and with little bubble can be obtained in short period of time.

Further, the optical glass according to the present embodiment can reduce the coloring efficiently by the re-heating treatment even in case of comprising large amount of high refractive index component.

Note that, the glass according to the present embodiment can be produced by the same method as the glass according to main embodiment of the above.

The Embodiment According to the Second Modified Example

The optical glass of the first embodiment according to the second modified example has the refractive index nd of 1.9 or more and less than 1.97, and it is an oxide glass including at least one oxides selected from the group consisting of $TiO_2$, $Nb_2O_5$, $WO_3$ and $Bi_2O_3$ as the glass component, wherein the total content of $TiO_2$, $Nb_2O_5$, $WO_3$ and $Bi_2O_3$ is within the range of 30 mol % to 60 mol %, and the value of βOH shown in the below equation (1) satisfies 0.1 $mm^{-1}$ or more.

$$\beta OH = -\ln(B/A)/t \qquad (1)$$

Also, the optical glass of the second embodiment according to the second modified example has the refractive index of 1.97 or more, and it is an oxide glass including at least one oxides selected from the group consisting of $TiO_2$, $Nb_2O_5$, $WO_3$ and $Bi_2O_3$ as the glass component, wherein the total content of $TiO_2$, $Nb_2O_5$, $WO_3$ and $Bi_2O_3$ is within the range of 40 mol % to 80 mol %, and the value of βOH shown in the below equation (1) satisfies 0.1 $mm^{-1}$ or more.

$$\beta OH = -\ln(B/A)/t \qquad (1)$$

In the following description, "the optical glass material" is the glass produced via the molding step which molds the molten glass in the melting container to a predetermined shape, and refers to the glass having dark coloring of before the heat treatment. Also, "the optical glass" refers to the glass of which the optical glass material having dark color is heat treated. That is, "the optical glass" is the glass wherein the coloring is reduced than "the optical glass material" by carrying out the heat treatment. Also, "the optical glass material" and "the optical glass", and "the glass material for press-molding", "the optical glass" and "other optical glass product" produced by "the optical glass material" or "the optical glass" is glass having the amorphous form, and it is not crystalline glass.

In the optical glass of the first and the second embodiment, even though the high refractive index component selected from the group consisting of $TiO_2$, $Nb_2O_5$, $WO_3$ and $Bi_2O_3$ is comprised by a large amount within the above mentioned range, the coloring is little. For the reason such effect can be obtained is speculated as below by the present inventors.

First, when melting the glass having high refractive index including the high refractive component such as $TiO_2$, $Nb_2O_5$, $WO_3$ and $Bi_2O_3$ using the melting container of the noble metal such as platinum, the metal ion is suppressed from dissolving into the molten glass by placing the molten glass to the reduced side when carrying out the melting. However, if the molten glass is reduced too much, as previously mentioned, the melting container turns into alloy. Also, even if the molten glass is not reduced too much, but if the coloring degree of the glass increases by the high refractive index component being reduced, the degree of the reduction of the coloring will be only small even after the heat treatment is carried out to this glass in the subsequent step.

In order to overcome such problem, the optical glass material may be made by forming a condition wherein the metal material constituting the melting container does not dissolve into the molten glass, and by carrying out the heat treatment to the obtained optical glass material, the coloring can be reduced significantly.

The present inventors speculate regarding the phenomena of coloring reduction of the glass due to the heat treatment as follows. First, the coloring of the optical glass can be reduced by carrying out the heat treatment of the optical glass material under the oxidizing atmosphere, however each ion of Ti, Nb, W, Bi or so which are in the reduced state are oxidized, and the visible light absorbance of each ion becomes weaker. If the speed of oxidizing Ti, Nb, W and Bi are slow, the improvement of the coloring will be small even if the optical glass material is heat treated. In order to significantly reduce the coloring of the optical glass material, the oxidizing speed of Ti, Nb, W and Bi during the heat treatment can be made larger. If there is an ion which easily moves in the glass, and as long as this ion does not directly influence the coloring, such ion may make speedy movement in the glass and may give the electric charge, thereby it would be possible to reduce the coloring in short period of time caused by the reduction of Ti, Nb, W, Bi which has been reduced. As for such ion, $H^+$ is thought to be suitable; however, in order to make $H^+$ further easier to move, $OH^-$ is introduced in the glass structure to allow the hopping of $H^+$ from $OH^-$, thereby it is thought that the oxidation speed during the heat treatment can be increased.

In order to introduce $H^+$ and $OH^-$ in the optical glass material, $H_2O$ is to be introduced in the optical glass material. Here, the water content of the optical glass material can be quantified indirectly by measuring the infrared absorbance intensity by $OH^-$ for the optical glass with little coloring and improved transmittance.

Therefore, in the optical glass material having the refractive index of 1.9 or more and less than 1.97, which is an oxide glass including at least one oxide selected from the group consisting of $TiO_2$, $Nb_2O_5$, $WO_3$ and $Bi_2O_3$ as the glass component and the total content of $TiO_2$, $Nb_2O_5$, $WO_3$ and $Bi_2O_3$ is within the range of 30 mol % to 60 mol %; or in the optical glass material having the refractive index of 1.97 or more, which is an oxide glass including at least one oxide selected from the group consisting of $TiO_2$, $Nb_2O_5$, $WO_3$ and $Bi_2O_3$ as the glass component and the total content of $TiO_2$, $Nb_2O_5$, $WO_3$ and $Bi_2O_3$ is within the range of 40 mol % to 80 mol %; by having the value of βOH, which is the indicator of the content of $OH^-$ in the optical glass, of 0.1 $mm^{-1}$ or more in the optical glass material, the coloring can be made little.

Further, when producing the optical glass material including lots of water such that the value βOH is 0.1 $mm^{-1}$ or more, the procedure such as the addition of the water vapor to the melting atmosphere, or the bubbling of the water vapor to the molten material is carried out. These procedures reduces the oxygen partial pressure in the melting atmosphere, hence the oxidation of the metal material (including the alloy material) constituting the melting container used for the melting of the molten glass is suppressed. As a result, the dissolving amount of the metal material to the molten glass is reduced, and the increase of the coloring caused by the dissolving of the metal material (including the alloy material) can be suppressed. Note that, the value of βOH can be measured for the optical glass material with dark coloring as same as the optical glass, since the infrared light can transmit through the optical glass material.

Next, in regards with the optical glass of the first and the second embodiment, the reason why the lower limit of the value of βOH has been set to 0.1 $mm^{-1}$ will be described.

Figure 3:
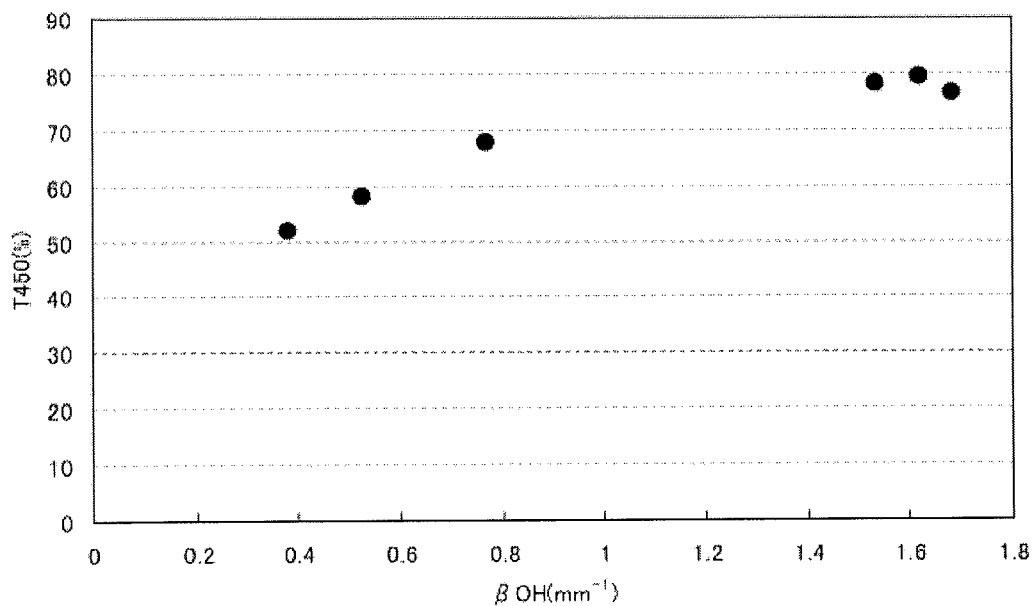
FIG. 3 Regarding the second modified example of the present invention.

FIG. 3 is a graph showing the change of the external transmittance (T450) at the wavelength of 450 nm when the light enter parallel to the thickness direction of the No. 1 glass having the thickness of 5 mm with respect to βOH value when βOH value of the No. 1 glass is changed from the composition of the Table 1. Note that, the value of the external transmittance (T450) shown in FIG. 3 is the value of after the heat treatment of the No. 1 glass for 1 hour at 600° C. in the air, and the value of βOH is also the value after the heat treatment. Also, No. 1 glass has the refractive index nd of 1.9 or more, and the total content of $TiO_2$, $Nb_2O_5$, $WO_3$ and $Bi_2O_3$ is within the range of 30 mol % to 60 mol %. That is, No. 1 glass is the same as the optical glass of the first embodiment for the refractive index nd and the glass composition.

TABLE 1

| Glass component (mol %) | No. 1 | No. 2 |
|---|---|---|
| $P_2O_5$ | 25.43 | 23.43 |
| $B_2O_3$ | 4.07 | 4.45 |
| $SiO_2$ | 1.18 | 1.29 |
| $TiO_2$ | 26.6 | 15.5 |
| $Nb_2O_5$ | 25.04 | 24.74 |
| $WO_3$ | 0 | 0 |
| $Bi_2O_3$ | 0 | 0 |
| $Na_2O$ | 10.28 | 4.99 |
| $K_2O$ | 6.01 | 2.46 |
| BaO | 1.39 | 21.24 |
| ZnO | 0 | 1.9 |
| Total | 100 | 100 |
| $TiO_2 + N_2O_5 + WO_3 + Bi_2O_3$ | 51.64 | 40.24 |
| Refractive index nd | 1.9546 | 1.922 |
| Abbe number νd | 17.9 | 20.9 |
| Glass transition temperature Tg (° C.) | — | — |
| Liquidus temperature LT (° C.) | 1100 | 1080 |

Figure 4:
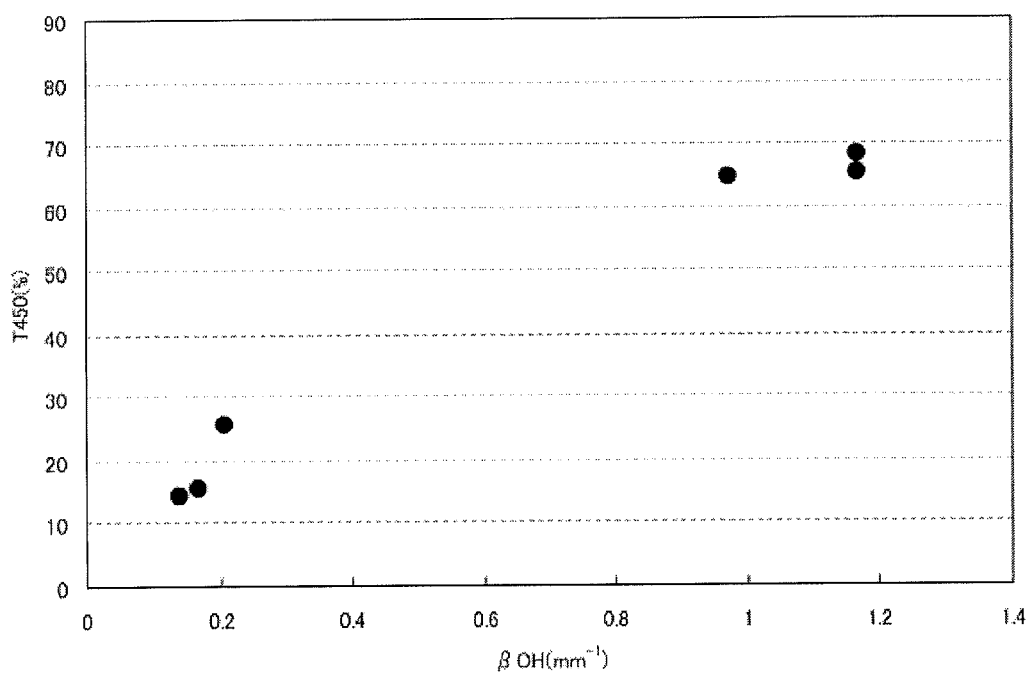
FIG. 4 Regarding the third modified example of the present invention.

Also, FIG. 4 is a graph showing the change of the external transmittance (T450) at the wavelength of 450 nm when the light enter parallel to the thickness direction of the No. 3 glass having the thickness of 5 mm with respect to βOH value when βOH value of the No. 3 glass is changed from the composition of the Table 2. Note that, the value of the external transmittance (T450) shown in FIG. 4 is the value of after the heat treatment of the No. 3 glass for 4.5 hours at 570° C. in the air, and the value of βOH is also the value after the heat treatment. Also, No. 3 glass has the refractive index nd of 1.97 or more, and the total content of $TiO_2$, $Nb_2O_5$, $WO_3$ and $Bi_2O_3$ is within the range of 40 mol % to 80 mol %. That is, No. 3 glass is the same as the optical glass of the second embodiment for the refractive index nd and the glass composition.

TABLE 2

| Glass component (mol %) | No. 3 | No. 4 |
|---|---|---|
| $P_2O_5$ | 22.579 | 25.5 |
| $B_2O_3$ | 2.826 | 2.0 |
| $SiO_2$ | 1.613 | 0 |
| $TiO_2$ | 18.148 | 7.0 |
| $Nb_2O_5$ | 16.535 | 18.0 |
| $WO_3$ | 14.515 | 8.0 |
| $Bi_2O_3$ | 20.966 | 20.0 |
| $Li_2O$ | 0 | 6.0 |
| $Na_2O$ | 0 | 10.5 |
| $K_2O$ | 0 | 2.0 |
| BaO | 2.818 | 1.0 |
| ZnO | 0 | 0 |
| Total | 100 | 100 |
| $TiO_2 + N_2O_5 + WO_3 + Bi_2O_3$ | 70.164 | 53.0 |
| Refractive index nd | 2.10639 | 2.003 |
| Abbe number νd | 17.01 | 19.1 |
| Glass transition temperature Tg (° C.) | 562.5 | 486 |
| Liquidus temperature LT (° C.) | 970 | 920 |

Further, the five values of βOH shown in FIG. 3 and FIG. 4 are the value set by regulating the amount of the water vapor introduced into the glass melting atmosphere when melting No. 1 glass and No. 3 glass. As obvious from FIG. 3 and FIG. 4, as the values of βOH increases the external transmittance (T450) increases as well. Also, according to the trends of the change of the external transmittance (T450) against the values of βOH shown in FIG. 3, it is understood that when the value of βOH is 0.1 mm$^{-1}$ or more, the external transmittance (T450) exceeds 30% for sure. Also, according to the trend of the change of the external transmittance (T450) against the values of βOH shown in FIG. 4, it is understood that when the value of βOH is 0.1 mm$^{-1}$ or more, the external transmittance (T450) exceeds 10% for sure.

As such, for both No. 1 glass and No. 3 glass, by extending the heat treatment time, the external transmittance (T450) further increases, and the suitable transmittance characteristic as the material of the optical element can be obtained.

When fixing the optical element to the lens barrel or so, the processing property can be significantly improved by using the adhesive agent of ultraviolet ray curable type. For the optical element using the optical glass having high refractive index of the refractive index nd of 1.9 or more or the refractive index nd of 1.97 or more, the light of the short wavelength side at the visible light range is cut by the optical glass, thus it was difficult to cure by irradiating the adhesive agent curing light across the optical element. However, by improving the transmittance of the short wavelength side at the visible light range, it is possible to adhere which uses the adhesive agent of the ultraviolet ray curable type.

Therefore, considering the light transmitting property of the optical element constituting the optical system and the convenience of adhesive handling when using the ultraviolet ray curable adhesive agent, in case of the optical glass according to the first embodiment, the lower limit of βOH is preferable in the increasing order of, 0.2 mm$^{-1}$, 0.3 mm$^{-1}$, 0.4 mm$^{-1}$, 0.5 mm$^{-1}$, 0.6 mm$^{-1}$, 0.7 mm$^{-1}$, 0.8 mm$^{-1}$. Also, in case of the optical glass according to the second embodiment, the lower limit of βOH is preferable in the increasing order of, 0.15 mm$^{-1}$, 0.2 mm$^{-1}$, 0.25 mm$^{-1}$, 0.3 mm$^{-1}$, 0.35 mm$^{-1}$, 0.4 mm$^{-1}$, 0.45 mm$^{-1}$, 0.5 mm$^{-1}$, 0.55 mm$^{-1}$, 0.6 mm$^{-1}$, 0.65 mm$^{-1}$, 0.7 mm$^{-1}$, 0.75 mm$^{-1}$, 0.8 mm$^{-1}$, 0.85 mm$^{-1}$, 0.9 mm$^{-1}$. By making the value of βOH large as such, the external transmittance (T450) increases, and the coloring of the optical glass can be easily made little.

Note that, the optical glass of the first and the second embodiment is preferably phosphate based glass. The phosphate based glass tends to take the water in easier than borate based glass, thus the coloring of the optical glass can be reduced further easier.

In this case, the optical glass of the first embodiment preferably includes 15 mol % to 35 mol % of $P_2O_5$ as the glass component. By making the content of $P_2O_5$ to 15 mol % or more, the water content in the optical glass can be increased, and the value of βOH can be made further larger easily. On the other hand, by making the content of $P_2O_5$ to 35 mol % or less, the high refractive index becomes easy to maintain. Note that, the preferable lower limit of the content of $P_2O_5$ is 17 mol %, and the preferable upper limit is 33 mol %.

Also, the optical glass of the second embodiment preferably includes 10 mol % to 35 mol % of $P_2O_5$ as the glass component. By making the content of $P_2O_5$ to 10 mol % or more, the water content in the optical glass can be increased, and the value of βOH can be made further larger easily. On the other hand, by making the content of $P_2O_5$ to 35 mol % or less, the high refractive index becomes easy to maintain. Note that, the preferable lower limit of the content of $P_2O_5$ is 12 mol %, and the preferable upper limit is 33 mol %.

Not that, the coloring degree of the optical glass can be quantified by λτ80 which is the indicator to show the coloring degree. λτ80 refers to the wavelength (nm) wherein the internal transmittance (internal transmittance τ) is 80% which is calculated first by measuring the internal transmittance at the range of the wavelength 280 to 700 nm when the light enter into the optical glass parallel to the thickness direction thereof, then assuming that the thickness of the optical glass based on the internal transmittance measured is 10 mm. Here, the internal transmittance τ is the transmittance excluding the surface reflection loss at the incident side and the emitting side; and is a value obtained by measuring the transmittance T1, T2 including the surface reflection loss of each sample using two samples with different thickness, that is by carrying out the measurement of the external transmittance T1, T2 within the wavelength range of 280 nm to 1550 nm, and calculated based on the following equation (9) using these measured value.

$$\log \tau = -(\log T1 - \log T2) \times 10/\Delta d \quad (9)$$

Here, in the equation (9), T1 is the transmittance (%) including the surface reflection loss measured in the wavelength range of 280 nm to 1550 nm when the light enters parallel to the thickness direction of first sample, wherein the thickness of the first sample is d1 (mm). T2 is the transmittance (%) including the surface reflection loss measured in the wavelength range of 280 nm to 1550 nm when the light enters parallel to the thickness direction of second sample, wherein the thickness of the second sample is d2 (mm) made of same glass as the first sample. Note that, λτ80 is calculated using the result of the transmittance measurement at the wavelength of 280 to 700 nm, thus the measurement of the transmittance T1 and T2 may be carried out within the wavelength range of 280 to 700 nm. Also, Δd is the difference d2−d1 (mm) between the thickness d1 and the thickness d2; and the thickness d1 and the thickness d2 satisfies the relation of d1<d2.

λτ80 increases as the total content of $TiO_2$, $Nb_2O_5$, $WO_3$ and $Bi_2O_3$ increases. In case the total content of $TiO_2$, $Nb_2O_5$, $WO_3$ and $Bi_2O_3$ in mol % expression is X, when the optical glass is produced by heat treating the optical glass material without increasing the water content in the optical glass material prior to the heat treatment in the oxidizing atmosphere, X and λτ80 satisfies the below equation (10). Therefore, it is difficult to drastically improve λτ80.

$$λτ80 > aX+b \quad (10)$$

Note that, in the equation (10), "a" is the constant (1.8359 nm/mol %), and "b" is the constant (351.06 nm).

On the other hand, in the production method of the optical glass of the first embodiment, λτ80 can be reduced so that it satisfies the below equation (11).

$$λτ80 < aX+b \quad (11)$$

Note that, in the equation (11), "a" and "b" are the same as the equation (10).

Note that, the optical glass of the first and the second embodiment preferably satisfies the below equation (12), and further preferably satisfies the equation (13).

$$λτ80 < aX+c \quad (12)$$

$$λτ80 < aX+d \quad (13)$$

Here, in the equation (12), "a" and "b" are the same as the equation (10). In equation (13), "a" and "b" are the same as the equation (10) as well. In equation (12), "c" is the constant (348.06 nm). Also, in the equation (13), "d" is the constant (345.06 nm).

According to the optical glass of the first and the second embodiment, when λτ80 or more and within the wavelength range of 700 nm or less, the internal transmittance converted to the thickness of 10 mm is 80% or more; and preferably even when λτ80 or more and within the wavelength range of 1550 nm or less, preferably the internal transmittance converted to the thickness of 10 mm is 80% or more.

Note that, conventionally, antimony oxide having an oxidation effect has been added since it suppresses the reduction of the high refractive index component during the glass melting. However, when producing the optical glass of the first and the second embodiment, the coloring can be made less without using the oxidation effect of the antimony oxide. Further, by adding the antimony oxide, the metal material constituting the melting container is ionized by being oxidized, and dissolves into the optical glass material, and it may cause the coloring of the optical glass obtained at the end. Therefore, in the optical glass of the first and the second embodiment, it is preferable to have the content of the antimony oxide of less than 1000 ppm and more preferably less than 700 ppm in terms of $Sb_2O_3$. Note that, the upper limit of the content of antimony oxide is preferable in the order of 600 ppm, 500 ppm, 400 ppm, 300 ppm, 200 ppm, 100 ppm; and it is further preferable to be less than these values. Further, the optical glass of the first and the second embodiment may be free of antimony oxide.

The optical glass of the first and the second embodiment preferably has the composition including $P_2O_5$ and at least one oxide selected from the group consisting of $TiO_2$, $Nb_2O_5$, $WO_3$ and $Bi_2O_3$; and in addition to this, it is further preferable to have the composition including alkali metal oxides, alkali earth metal oxides, ZnO, $B_2O_3$, $SiO_2$ or so as arbitrary components. Even for the optical glass comprising such composition, the content of $P_2O_5$ and the total content of said $TiO_2$, $Nb_2O_5$, $WO_3$ and $Bi_2O_3$ are within said preferable range.

Also, in the optical glass of the first and the second embodiment, alkali metal oxides such as $Li_2O$ or so may be included. Here, in case of using $Li_2O$, from the point of obtaining high refractive glass, the content there of is preferably more than 0 mol % and less than 10 mol %, more preferably more than 0 mol % and 9 mol % or less, and further preferably more than 0 mol % and 8 mol % or less. Also, in the optical glass of the first and the second embodiment, $GeO_2$ and/or $Ga_2O_3$ may be included. Note that, since these oxides are expensive, $Ga_2O_3$ may not be included in the optical glass, however in case it is included, and it is preferable to reduce the content thereof as less as possible. Here, in case $GeO_2$ is included in the optical glass, the content thereof is preferably more than 0 mol % and 5 mol % or less, more preferably more than 0 mol % and 2 mol % or less, and further preferably more than 0 mol % and 1 mol % or less. Also, in case $Ga_2O_3$ is included in the optical glass, the content thereof is preferably more than 0 mol % and 0.5 mol % or less, more preferably more than 0 mol % and 0.2 mol % or less, and further preferably more than 0 mol % and 0.1 mol % or less. The optical glass of the first and the second embodiment may not include $Li_2O$, may not include $GeO_2$ and may not include $Ga_2O_3$.

In the optical glass of the first and the second embodiment, considering the environmental influence, it is preferable to be free of Pb, As, Cd, U, Th as the glass component. From the point of preventing the increase of the coloring, it is preferable to be free of the component which absorbs the visible light such as Cr, Ni, Eu, Er, Tb, Fe, Cu, Nd or so. Te may be included in the within the range which does not interfere the object of the present invention; however from the point of the environmental influence, it is preferably not included as the glass component. Note that, in the present specification, by referring "not include", it does not exclude the amount which is inevitably included as the impurities.

Next, the production method of the optical glass of the first and the second embodiment will be described.

In the production method of the optical glass of the first embodiment, the optical glass material which is the oxide glass comprising at least one oxide selected from the group consisting of $TiO_2$, $Nb_2O_5$, $WO_3$ and $Bi_2O_3$ as a glass component, in which the total content of said $TiO_2$, $Nb_2O_5$, $WO_3$ and $Bi_2O_3$ is 30 mol % to 60 mol % is produced by at least going through the heating and melting step of the glass raw material in the melting container to obtained the molten glass, and the molding step of molding the molten glass in the melting container into a predetermined shape. Next, this optical glass material is carried out with the heat treating in the oxidizing atmosphere; thereby the optical glass of the first embodiment is obtained.

In the production method of the optical glass of the second embodiment, the optical glass material which is the oxide glass comprising at least one oxide selected from the group consisting of $TiO_2$, $Nb_2O_5$, $WO_3$ and $Bi_2O_3$ as a glass component, in which the total content of said $TiO_2$, $Nb_2O_5$, $WO_3$ and $Bi_2O_3$ is 40 mol % to 80 mol % is produced by at least going through the heating and melting step of the glass material in the melting container to obtained the molten glass, and the molding step of molding the molten glass in the melting container into a predetermined shape. Next, this optical glass material is carried out with the heat treating in the oxidizing atmosphere; thereby the optical glass of the second embodiment is obtained.

Here, during the heating and melting step, by regulating the water content included in the molten glass in the melting container, the value of βOH of the optical glass may be controlled to 0.1 mm$^{-1}$ or more.

In the production method of the optical glass of the first and the second embodiment, as for the regulating method of the glass material, the heating method and the melting method of the glass material, and the molding method of the molten glass, the known methods can be used appropriately. Also, from the point of obtaining the uniform optical glass, the melting container is preferably constituted by the metal material. Here, as for the metal material constituting the melting container, noble metals such as platinum or gold, and noble metal alloys such as platinum alloy and gold alloy or so are preferable since it has excellent erosion resistance and heat resistance.

Here, as the regulating method of the water content included in the molten glass, it is preferable to use any one of the first water content regulating method supplying the water vapor to the atmosphere of which is melting the molten glass, the second water content regulating method supplying the water vapor by bubbling in the molten glass, and the third water content regulating method combining the first water content regulating method and the second water content regulating method. Note that, by referring as regulating the water content included in the molten glass in the melting container, it mainly refers to the procedure to increase the water content included in the molten glass as mentioned in the first to third water content regulating methods.

Note that, as the regulating method of the water content included in the molten glass in the melting container, the method of using the compound including the water as the glass raw material, for example the method of increasing the water content in the molten glass by using the glass raw material with orthophosphoric acid or boric acid. However, in this method, the water evaporates during the process of melting the glass raw material, thus it is difficult to secure the sufficient water content in the optical glass material and the optical glass. Further, in the method wherein the compound is mixed to make the raw material, and carrying out the rough melting of this raw material to form the cullet, then re-melting the cullet followed by re-melting in the melting container, the water which was originally included in the raw material is lost, and when the re-melting is carried out in the melting container, the water content is significantly reduced.

Therefore, in case of using the compound including the water such as orthophosphoric acid or boric acid as the glass raw material, it is preferable to increase the water vapor partial pressure in the melting atmosphere by suppressing the evaporation of the water from the molten glass. Alternatively, in case the compound including the water as the glass raw material, the melting container is made air-tight, thereby the water vapor may be made not to evaporate out of the melting container during the heating and melting step. Such procedure is also included for the regulation of the water content included in the molten glass in the melting container.

Note that, the heating and the melting step includes the melting step of heating the glass raw material and melting the mold glass, the refining step facilitating the bubble removal of the molten glass, and the uniforming step of uniforming and stirring the molten glass of after the refining by decreasing the temperature so that the viscosity is suitable for the molding. In case of using the cullet as the glass raw material, the cullet forming step of carrying out the rough melting of the glass raw material mixed with the aforementioned compound so called the batch raw material to form the cullet is carried out before the melting step.

Even for the method of producing the cullet, or even for the method of melting the batch raw material in the direct melting step, from the point of suppressing the excessive reduction of Ti, Nb, W and Bi, and in case the melting container is constituted from the metal material to suppress the ionization of the metal material thereof, and thereby securing the water content in the optical glass material and the optical glass, it is preferable to maintain the heating temperature of the glass during the heating and melting temperature to 1400° C. or less, and further preferably maintain to 1300° C. or less. Further, from the point of improving the transparency and the obtaining the optical glass with little coloring, it is preferable to set so that the heating temperature of the glass during the heating and melting step is at the highest at the refining step, that is it is preferable to melt the glass at the temperature below the refining temperature.

Also, if the time from the start to the end of the heating-melting step is too long, it promotes the reduction of the high refractive index component, and in case the melting container is made of metal material, the ionization of the metal material thereof is facilitated, thus the water content in the optical glass tends to decline. Therefore, it is preferable that the time from the start to the end of the heating-melting step is within 100 hours. Note that, the time from the start to the end of the heating-melting step may be adjusted appropriately depending on the size of the capacity of the melting container. By carrying out the heat treatment of the optical glass being melted and molded as such in the oxidizing atmosphere, the coloring of the optical glass can be made small.

As the oxidizing atmosphere gas, the air, the gas added with the oxygen in the air, and oxygen or so may be used. Also, the heat treating temperature and the heat treating time is preferably set so that λτ80 satisfy the equation (11), and more preferably set so that λτ80 satisfies the equation (12), and further preferably set so that λτ80 satisfies the equation (13).

The glass material for press-molding of the present embodiment and the optical element of the present embodiment include the optical glass of the first and the second embodiment, and in general only consisted from the optical glass of the first and the second embodiment.

The glass material for press-molding is the glass material for obtaining the press-molding product, specifically the optical blank or the optical element by heating and melting the optical glass and press molding. As the production method of the press molding glass material, for example the method of separating the flowing molten glass flow to form the molten glass bulk and molding into the press molding glass material during the process of cooling this molten glass bulk; and the method of molding the glass block by introducing the molten glass and forming the press molding glass material by processing the glass block.

As for the example of the optical element, various lenses such as the spherical lenses, non-spherical lenses, and prism or so may be mentioned. The optical element of the present embodiment can be produced by going through the subsequent processing step wherein the optical glass of the present embodiment is subsequently processed. As the subsequent processing, various known subsequent processing such as heat treating, molding, polishing or so can be carried out appropriately, and depending on the needs, two or more of the subsequent processing treatments can be combined. As for the method of producing the optical element by the subsequent processing, the method of producing the optical element blank by heating and softening the optical glass (or the press molding glass material) then press molding, and processing the optical element blank; and the method of obtaining the optical element by producing the optical element blank by press molding the molten glass then processing the optical element or so may be mentioned.

Note that, when producing the press molding glass material and the optical element, it may be produced by using the optical glass material used for the production of the optical glass first and the second embodiment, and carrying out various processing such as the molding and the polishing or so, then carrying out the heat treating for reducing the coloring.

EXAMPLE

Hereinbelow, the present invention will be described based on the examples, however the present invention is not to be limited thereto.

Example 1

The Preparation of the Batch Raw Material

First, for producing the optical glass comprising the desired characteristics, phosphoric acid, barium metaphosphate, titanium oxide, niobium oxide, tungsten oxide, bismuth oxide, boric acid, barium carbonate, sodium carbonate, potassium carbonate and silicon oxide were prepared as the glass raw material. Next, the above mentioned raw materials were accordingly selected, scaled and thoroughly mixed so that the glass composition of the optical glass which will be obtained at the end satisfies the oxide composition I to VIII shown in Table 3, thereby the batch raw materials I to VIII were produced.

TABLE 3

| Glass component | Oxide composition (mol %) | | | | | | | |
|---|---|---|---|---|---|---|---|---|
| | I | II | III | IV | V | VI | VII | VIII |
| $P_2O_5$ | 19.8 | 21.6 | 23.6 | 24.6 | 25.7 | 30.4 | 22.6 | 21.5 |
| $TiO_2$ | 11.3 | 17.0 | 11.8 | 19.3 | 26.7 | 21.2 | 18.2 | 21.2 |
| $Nb_2O_5$ | 21.9 | 15.0 | 29.3 | 28.2 | 26.3 | 20.6 | 16.5 | 19.3 |
| $WO_3$ | — | — | — | — | — | 9.0 | 14.5 | 9.4 |
| $Bi_2O_3$ | — | — | — | — | — | 10.1 | 20.9 | 24.5 |
| $B_2O_3$ | 15.1 | 10.7 | 6.2 | 5.0 | 3.8 | 1.9 | 2.8 | 2.4 |
| BaO | — | 17.0 | 22.1 | 12.1 | 1.5 | 2.1 | 2.8 | 1.7 |
| $Na_2O$ | 27.2 | 13.6 | 7.0 | 5.0 | 10.0 | 3.0 | — | — |
| $K_2O$ | 4.7 | 5.1 | — | 5.8 | 6.0 | 1.7 | — | — |
| $SiO_2$ | — | — | — | — | — | — | 1.6 | — |

[The Production of the Cullet and the Mixed Cullet (the Rough Melting Step)]

The batch raw materials I to VIII being mixed was made as the glass raw material of each optical glass. This glass raw material was introduced into the crucible made of quartz, and melted at 900 to 1350° C. in the air atmosphere, thereby obtained the molten material. The molten material obtained as such was dropped into the water to obtain the cullet.

The cullet which was taken out of the water was dried, and a part of the cullet was sampled for the refractive index measurement, and melted by placing in the crucible made of platinum, then refined the obtained glass molten liquid and was made uniform. Then, it was introduced in the mold for molding, and maintained at the temperature near the glass transition temperature, then cooled at the temperature decreasing speed of 30° C./hour. The refractive index nd of the refractive index measurement sample obtained as such was measured by the refractive index measurement method in accordance with Japan Optical Glass Industry Society Standard.

Next, depending on the measured refractive index nd, the cullet was mixed so that it satisfies the desired refractive index, thereby obtained the mixed cullet for the production of the optical glass.

[The Production of the Optical Glass (Re-Melting Step)]

Next, the mixed cullet was introduced into the crucible made of platinum (melting container), and within the range of 800 to 1350° C., the mixed cullet in the crucible made of platinum was heated and melted to form the molten glass (melting step).

Then, the temperature of the crucible was increased to the refining temperature (900 to 1450° C.) for refining (refining step). Then, the temperature of the crucible was cooled to uniforming temperature, then stirred using the stirring apparatus thereby it was uniformed (uniforming step).

Note that, the volume of the melting furnace (the volume of the space inside the furnace of flame resistant which houses the crucible) and the placement time of the molten material in the melting furnace (the time from the introduction of the cullet to the platinum crucible container until the molten glass drains out from the melting container) are shown in Table 4.

Also, for carrying out the melting step, refining step, and uniforming step, the procedure to increase the water content in the molten glass was carried out depending on the needs.

Specifically, the pipe made of platinum was inserted from the outside of the furnace into the crucible made of platinum placed inside the furnace, and the water vapor ($H_2O$ 100 vol %) was supplied to the space inside the crucible made of platinum via this pipe made of platinum. As such, the addition of the water vapor to the melting atmosphere was carried out by adding the water vapor to the air. The flow amount of the supplied water vapor is shown in Table 4.

Also, if necessary, the water vapor ($H_2O$ 100 vol %) was bubbled into the molten material from the tube provided at the lower part of the crucible. As such, the bubbling of the water vapor to into the molten material was carried out by bubbling the water vapor to the molten material in the air atmosphere or to the molten material in the melting atmosphere added with the water vapor to the air. The flow amount of the water vapor supplied is shown in Table 4.

Note that, the flow amount of the water vapor shown in Table 4 is the value converted to the flow amount at the usual temperature and usual pressure, and the unit is littler/min.

Also, in case the water vapor is not supplied, the lid made of platinum was not used, and while the melting container was kept opened, the melting step to the uniforming step via the refining step were all carried out under the air atmosphere.

TABLE 4

| Sample No. | Oxide composition | Volume litter | Placement time | The procedure to increase the water content | |
|---|---|---|---|---|---|
| | | | | Atmospheric adding flow amount litter/min | bubbling flow amount litter/min |
| 11 | I | 40 | 4.5 | — | — |
| 12 | | 93 | 8.6 | — | — |
| 13 | | 40 | 4.5 | 15 | — |
| 14 | | 40 | 4.5 | 40 | — |
| 15 | | 40 | 4.5 | 320 | — |
| 16 | | 40 | 4.5 | 320 | 4 |
| 21 | II | 40 | 4.8 | — | — |
| 22 | | 93 | 9.1 | — | — |
| 23 | | 121 | 9.8 | — | — |
| 24 | | 40 | 4.8 | 40 | — |
| 25 | | 40 | 4.8 | 320 | — |
| 26 | | 40 | 4.8 | 350 | — |
| 31 | III | 40 | 5.5 | — | — |
| 32 | | 93 | 9.7 | — | — |
| 33 | | 40 | 5.5 | 250 | — |
| 34 | | 40 | 5.5 | 300 | — |
| 35 | | 40 | 5.5 | 320 | — |
| 41 | IV | 40 | 5.2 | — | — |
| 42 | | 93 | 9.7 | — | — |
| 43 | | 40 | 5.2 | 10 | — |
| 44 | | 40 | 5.2 | 250 | — |
| 45 | | 40 | 5.2 | 300 | — |
| 46 | | 40 | 5.2 | 320 | — |
| 51 | V | 40 | 7.8 | — | — |
| 52 | | 93 | 9.1 | — | — |
| 53 | | 40 | 4.8 | 15 | — |
| 54 | | 40 | 4.8 | 40 | — |
| 55 | | 40 | 4.8 | 320 | — |
| 56 | | 40 | 4.8 | 320 | 4 |
| 61 | VI | 40 | 6.5 | — | — |
| 62 | | 93 | 9.1 | — | — |
| 63 | | 40 | 6.5 | 15 | — |
| 64 | | 40 | 6.5 | 40 | — |
| 65 | | 40 | 6.5 | 300 | — |
| 66 | | 40 | 6.5 | 320 | — |
| 71 | VII | 40 | 7.3 | — | — |
| 72 | | 40 | 7.3 | 2 | — |
| 73 | | 6 | 5.0 | 34 | — |
| 81 | VIII | 40 | 7.3 | — | — |
| 82 | | 40 | 7.3 | 2 | — |
| 83 | | 6 | 5.0 | 12 | — |
| 84 | | 6 | 5.0 | 34 | — |

The molten glass which has been uniformed as such was drained out from the glass draining pipe made of platinum installed to the bottom part of the crucible (the draining step) in the air atmosphere, and by introducing into the mold placed at the lower side of the draining pipe, a long glass block (the width of 150 mm×the thickness of 10 mm) was molded (the molding step).

Then, the above mentioned glass block was increased with the temperature at the speed of +100° C./hour, and maintained for 1.5 to 8 hours at the temperature near each glass transition temperature, then cooled at the speed of −10° C./hour (the annealing step), thereby the optical glass sample removed with the strain was obtained.

[The Evaluation of the Optical Glass]

Various physical properties of the obtained optical glass sample (sample 11 to sample 84) were measured and evaluated as in below.

[1] The Glass Composition

The appropriate amount of the optical glass sample was taken, and treated with acid and alkaline, then using the inductively coupled plasma mass spectrometry method (ICP-MS method) and the ion chromatography method, the content of each component was quantitatively measured to confirm that it matches with the oxide composition I to VIII.

[2] The Refractive Index Nd, Abbe Number νd and the Glass Transition Temperature Tg The molten glass which has gone through the uniforming step when producing the optical glass sample was molded by introducing into the mold, and maintained at the temperature near the glass transition temperature, then cooled at the temperature decreasing speed of 10° C./hour to produce the measuring sample. For the obtained measuring sample, the refractive index nd, ng, nF, nc were measured in accordance with Japan Optical Glass Industry Society Standard. Further, by these measured value of the refractive indexes, Abbe number νd was calculated.

Next, optical glass sample was processed, and the measurement sample of column shape (the diameter of 5 mm and the height of 20 mm) was produced. For the obtained measurement sample, by using the thermomechanical analysis apparatus (TMA) and under the condition of the temperature rising speed of +10° C./min, the glass transition temperature Tg was measured.

Note that, these characteristic values were derived from the glass compositions, thus for the optical glass sample using the same batch raw material as the glass raw material were confirmed to have substantially the same values. The results are shown in Table 5.

TABLE 5

| | Oxide composition | | | | | | | |
|---|---|---|---|---|---|---|---|---|
| | I | II | III | IV | V | VI | VII | VIII |
| Refractive index nd | 1.81 | 1.87 | 1.92 | 1.93 | 1.95 | 2.02 | 2.11 | 2.16 |
| Abbe number νd | 22.5 | 21.8 | 20.9 | 19.2 | 18.0 | 17.8 | 17.0 | 16.2 |
| Glass transition temperature Tg (° C.) | 541 | 604 | 666 | 652 | 637 | 601 | 5.61 | 558 |

[3] βOH

The optical glass sample was processed, and then the plate shaped glass sample having the thickness of 1 mm being optically polished so that the both faces are flat and parallel to each other was prepared. To the polished face of this plate shaped glass sample, the light was entered in vertical direction, then the external transmittance A at the wavelength of 2500 nm, and the external transmittance B at the wavelength of 2900 nm were measured using the spectrophotometer, and βOH was calculated from the below equation (1).

$$\beta OH = -[\ln(B/A)]/t \quad (1)$$

In the above mentioned equation (1), ln is a natural logarithm, and the thickness t corresponds to the space between the two planar faces of the above mentioned. Also, the external transmittance includes the reflection loss at the glass sample surface, and it is the ratio (the transmitted light intensity/the incident light intensity) of the intensity of the transmitted light against the intensity of the incident light entering to the glass sample. Also, the higher the value of βOH is, the more water is included in the glass. The results are shown in Table 8 and FIG. 2.

Figure 2:
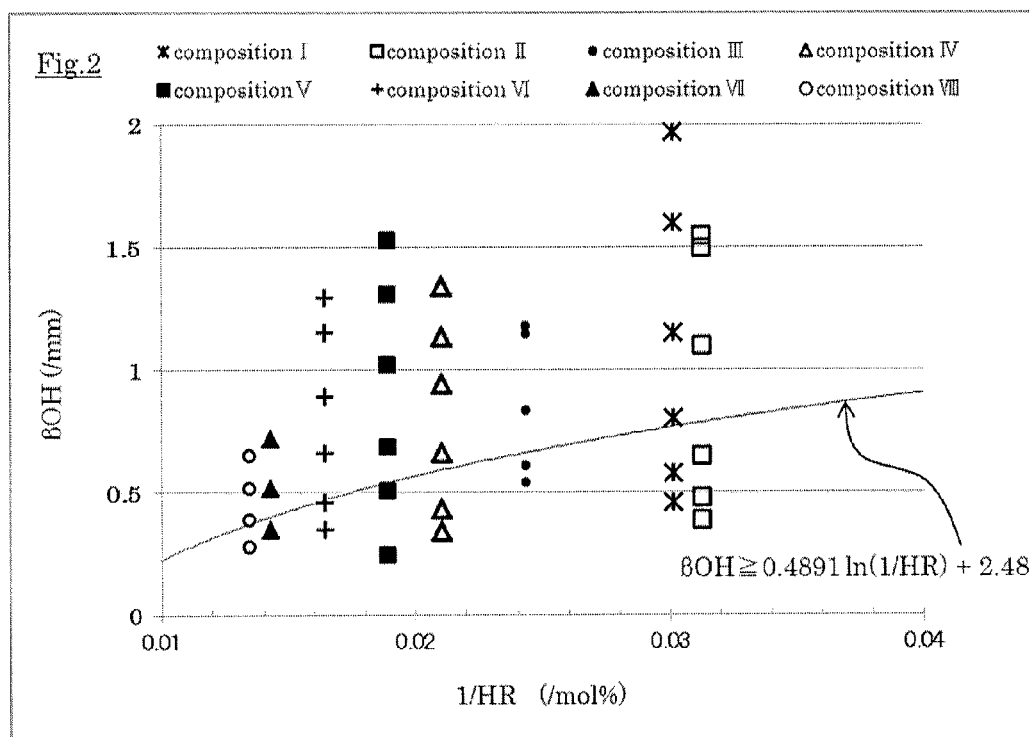
FIG. 2 is a graph showing the relation between βOH and the high refractive index component (HR) of the sample according to the embodiment of the present invention.

FIG. 2 is the graph plotting μOH of each optical glass sample for each glass composition. In FIG. 2, the bold line shows the border line separating the example and the comparative example defined by the below equation (2).

$$\beta OH \geq 0.4891 \times \ln(1/HR) + 2.48 \quad (2)$$

Note that, the value which separates the example and the comparative example of each composition (the lower limit value of βOH which can expect to exhibit the effect of the present invention) can be calculated by the above mentioned equation (2). That is, by the composition ratio of the above shown in Table 3, HR is calculated (the total content (mol %) of each component $TiO_2$, $Nb_2O_5$, $WO_3$ and $Bi_2O_3$ in the glass component), and introduces the above equation (2). The value calculated based on each oxide composition is shown in Table 8. The unit of βOH is $mm^{-1}$.

[4] T450 (H)

The optical glass sample was increased with the temperature at the speed of +100° C./hour in the air atmosphere, and maintained for 100 hours at the predetermined maintaining temperature, then the temperature was decreased at the speed of −30° C./hour, thereby the heat treatment was carried out. Note that, the maintaining temperature differs depending on the composition, thus it was set to temperature shown in Table 6 depending on the oxide compositions of each optical glass sample.

TABLE 6

| | Oxide composition | | | | | | | |
|---|---|---|---|---|---|---|---|---|
| | I | II | III | IV | V | VI | VII | VIII |
| Maintaining temperature (° C.) | 530 | 600 | 650 | 630 | 630 | 570 | 550 | 530 |

The optical glass sample carried out with the heat treatment was processed, and then the plate shaped glass sample having the thickness of 10 mm being optically polished so that the both faces are flat and parallel to each other was prepared. For the plate shaped glass sample obtained as such, the external transmittance T450(H) at 450 nm was obtained using the spectrophotometer. The larger the value of T450(H) is, the more excellent the transmittance is, and it means that the coloring of the glass is reduced. The results are shown in Table 8.

[5] Pt Content

An appropriate amount of the optical glass sample was taken, and this was carried out with alkali fusion to separate Pt, then Pt amount in the glass was quantified by ICP-MS method. The results are shown in Table 8.

[6] The Coloring Degree λ80 and λ70

First, the optical glass sample was heat treated under the same condition as T450(H).

The optical glass sample carried out with the heat treatment was processed, and then the plate shaped glass sample having the thickness of 10 mm±0.1 mm being optically polished so that the both faces are flat and parallel to each other was prepared. To the polished face of this plate shaped glass sample, the light entered in a vertical direction, and the spectral transmittance including the surface reflection loss within the range of the wavelength of 280 nm to 700 nm was measured using the spectrophotometer; then the wavelength wherein the spectral transmittance (the external transmittance) becomes 80% and 70% were determined as the coloring degree λ80 and λ70 respectively. The smaller the value of each of λ80 and λ70 are, the lesser the coloring of the glass is. The results are shown in Table 8. Note that, for the sample evaluated for λ80, the underline is shown in the result of Table 8.

[7] T450 (L)

0.5 to 0.7 cc of the molten glass which has gone through the uniforming step during the production of the optical glass sample was taken, and introduced into the concave part of the mold for a float molding (the mold having a structure wherein the concave part receiving the molten glass is formed of porous materials, and the gas was spurted out from the surface of the concave part via the porous material), then the gas spurts out from the concave part and upward gas pressure was applied to the molten glass on the concave part, thereby the glass bulk while floating was produced.

Then, the above mentioned glass bulk was increased with the temperature at the speed of +100° C./hour, and maintained at the predetermined maintaining temperature for predetermined maintaining time, then the temperature was lowered at the speed of −30° C./hour, thereby obtained the spherical optical glass sample of after the heat treatment. Note that, the maintaining temperature and the maintaining time differs depending on the composition, hence the temperature and the time were set as shown in Table 7 depending on the oxides composition of each optical glass sample.

TABLE 7

| | Oxide composition | | | | | | | |
|---|---|---|---|---|---|---|---|---|
| | I | II | III | IV | V | VI | VII | VIII |
| Maintaining temperature (° C.) | 500 | 550 | 650 | 630 | 600 | 600 | 550 | 500 |
| Maintaining time (h) | 2 | 4 | 4 | 4 | 1 | 5 | 5 | 6 |

The obtained spherical optical glass sample was processed, and then the plate shaped glass sample having the thickness of 5 mm being optically polished so that the both faces are flat and parallel to each other was prepared. For the plate shaped glass sample obtained as such, the external transmittance T450(L) at 450 nm was obtained using the spectrophotometer. The larger the value of T450(L) is, the more excellent the transmittance is, and it means that the coloring of the glass is reduced even after the heat treatment of short period of time.

[8] The Defoaming 40 cc of the molten glass (glass molten liquid) before the refining step during the production of the optical glass sample was taken, and was refined for certain period of time by separate platinum crucible, then the glass molten liquid was cooled down in the platinum crucible thereby it was solidified. During this step, the coloring was reduced so that the number of bubbles included in the glass can be counted. Next, the solidified glass was taken out from the platinum crucible.

The samples for the measurement obtained as such was observed by magnifying (100×) the inside of the glass using the optical microscope (the magnification of 20 to 100×), then the number of bubbles included in the glass was counted. The same observations were carried out to each sample for the measurement sample with different refining times, and the refining time of the measurement sample wherein the number of the bubbles remaining in the glass to be 100/kg were evaluated as the time for removing the bubbles. The shorter the defoaming is, the more excellent the refining property is. The results are shown in Table 8.

TABLE 8

| Sample No. | Oxide composition equation (2) | β-OH/ mm | T450 (H) % | Pt ppm | λ80/λ70 nm | T450 (L) % | Bubble removal min |
|---|---|---|---|---|---|---|---|
| 11 | I | 0.46 | 79.4 | 2.40 | 460 | 75.7 | 92 |
| 12 | βOH ≥ 0.77 | 0.58 | 79.4 | 2.00 | 457 | 80.0 | 84 |
| 13 |  | 0.80 | 80.0 | 1.40 | 446 | 81.4 | 78 |
| 14 |  | 1.15 | 81.2 | 0.97 | 435 | 82.5 | 72 |
| 15 |  | 1.60 | 81.7 | 0.54 | 427 | 82.1 | 61 |
| 16 |  | 1.97 | 81.8 | 0.26 | 423 | 84.3 | 55 |
| 21 | II | 0.39 | 77.4 | 2.80 | 417 | 76.9 | 88 |
| 22 | βOH ≥ 0.78 | 0.48 | 78.6 | 2.40 | 412 | 77.9 | 79 |
| 23 |  | 0.65 | 79.7 | 1.80 | 407 | 81.9 | 75 |
| 24 |  | 1.10 | 80.0 | 1.20 | 406 | 82.8 | 71 |
| 25 |  | 1.50 | 80.5 | 0.83 | 405 | 84.5 | 66 |
| 26 |  | 1.55 | 81.4 | 0.45 | 403 | 82.5 | 64 |
| 31 | III | 0.54 | 75.7 | 2.00 | 427 | 69.0 | 83 |
| 32 | βOH ≥ 0.66 | 0.61 | 76.5 | 1.90 | 425 | 75.1 | 81 |
| 33 |  | 0.83 | 77.1 | 1.70 | 415 | 78.4 | 78 |
| 34 |  | 1.14 | 78.2 | 0.61 | 411 | 82.2 | 77 |
| 35 |  | 1.18 | 78.8 | 0.49 | 409 | 81.4 | 75 |
| 41 | IV | 0.34 | 72.2 | 3.50 | 438 | 61.1 | 97 |
| 42 | βOH ≥ 0.59 | 0.43 | 74.5 | 2.80 | 425 | 66.6 | 92 |
| 43 |  | 0.66 | 76.8 | 1.90 | 417 | 72.3 | 87 |
| 44 |  | 0.94 | 77.3 | 1.30 | 416 | 78.2 | 84 |
| 45 |  | 1.13 | 77.9 | 0.87 | 414 | 79.9 | 83 |
| 46 |  | 1.34 | 78.5 | 0.62 | 413 | 80.2 | 76 |
| 51 | V | 0.25 | 68.5 | 2.80 | 457 | 34.5 | 83 |
| 52 | βOH ≥ 0.54 | 0.51 | 73.1 | 2.30 | 437 | 58.1 | 75 |
| 53 |  | 0.69 | 74.6 | 1.50 | 429 | 67.8 | 74 |
| 54 |  | 1.02 | 75.7 | 1.10 | 426 | 71.2 | 72 |
| 55 |  | 1.31 | 77.1 | 0.64 | 421 | 75.0 | 71 |
| 56 |  | 1.53 | 77.3 | 0.36 | 420 | 79.3 | 70 |
| 61 | VI | 0.35 | 67.3 | 3.10 | 461 | 28.0 | 89 |
| 62 | βOH ≥ 0.47 | 0.46 | 70.0 | 2.70 | 450 | 49.8 | 87 |
| 63 |  | 0.66 | 72.5 | 1.60 | 441 | 62.7 | 84 |
| 64 |  | 0.89 | 73.9 | 1.20 | 437 | 70.1 | 82 |
| 65 |  | 1.15 | 74.8 | 0.88 | 435 | 73.3 | 75 |
| 66 |  | 1.29 | 75.6 | 0.62 | 433 | 73.4 | 71 |
| 71 | VII | 0.35 | 56.1 | 3.00 | 485 | 25.6 | 85 |
| 72 | βOH ≥ 0.40 | 0.52 | 58.0 | 1.76 | 473 | 57.4 | 74 |
| 73 |  | 0.72 | 63.8 | 0.67 | 460 | 64.1 | 66 |
| 81 | VIII | 0.28 | 51.3 | 3.30 | 521 | 17.5 | 103 |
| 82 | βOH ≥ 0.37 | 0.39 | 54.8 | 1.90 | 502 | 25.2 | 94 |
| 83 |  | 0.52 | 57.0 | 1.50 | 494 | 44.9 | 88 |
| 84 |  | 0.65 | 61.2 | 0.88 | 480 | 56.4 | 83 |

As shown in Table 8 and FIG. 2, when the glass of the present invention wherein βOH of the optical glass sample satisfies the above mentioned equation (2), the improvement effect of the transmittance due to the heat treatment is significant, and the dissolved amount of Pt derived from the melting container is also significantly reduced, thus excellent transmittance was confirmed (samples 13 to 16, samples 24 to 26, samples 33 to 35, samples 43 to 46, samples 53 to 56, samples 63 to 66, sample 72, sample 73, and samples 82 to 84).

On the other hand, when βOH of the glass does not satisfy the above mentioned equation (2), then it corresponds to the comparative example of the present invention, and has small improving effect of the transmittance due to the heat treatment and the dissolved amount of Pt derived from the melting container is large, thus the transmittance was low (sample 11, sample 12, samples 21 to 23, sample 31, sample 32, sample 41, sample 42, sample 51, sample 52, sample 61, sample 62, sample 71, and sample 81).

Also, in case of the glass of the present invention, sufficient improving effect of the transmittance by the heat treatment can be obtained compared to the case of the glass which corresponds to the comparative example of the present invention, and also it was confirmed that the time needed for the bubble removal was short. That is, in case of the glass of the present invention, the time needed for the refining step and the heat treating step can be shortened significantly, and during the production of the optical glass, the production can be reduced and the productivity can be improved.

Example 2

The optical glass samples (samples 51a to 56a) were produced under the same condition as the samples 51 to 56 of the example 1 expect that antimony oxide (Sb$_2$O$_3$) were added to the batch raw material V as the glass material. The added amounts of antimony oxide are shown in Table 9. Note that, the unit is ppm with respect to 100 wt % of batch raw material.

[The Evaluation of the Optical Glass]

Various physical properties of the obtained optical glass samples (the samples 51a to 56a) were measured and evaluated under the same condition as the example 1.

As a result, the refractive index nd, Abbe number νd and the glass transition temperature Tg were substantially the same as the values shown in oxide composition of the example 1. The results are shown in Table 9.

TABLE 9

| | | | Procedure to increase the water content | | | | | |
|---|---|---|---|---|---|---|---|---|
| Sample No. | Sb2O3 ppm | Volume litter | Placement time hour | Atmospheric adding flow amount litter/min | bubbling flow amount litter/min | β-OH/ mm | T450 (H) % | Pt ppm | λ80/λ70 nm |
| 51a | 3000 | 40 | 7.8 | — | — | 0.25 | 64.3 | 3.0 | 467 |
| 52a | 3000 | 93 | 9.1 | — | — | 0.51 | 64.7 | 2.5 | 447 |
| 53a | 155 | 40 | 4.8 | 15 | — | 0.69 | 74.4 | 1.6 | 430 |
| 54a | 155 | 40 | 4.8 | 40 | — | 1.02 | 75.4 | 1.1 | 427 |

TABLE 9-continued

| | | | | Procedure to increase the water content | | | | | |
|---|---|---|---|---|---|---|---|---|---|
| Sample No. | Sb2O3 ppm | Volume litter | Placement time hour | Atmospheric adding flow amount litter/min | bubbling flow amount litter/min | β-OH/ mm | T450 (H) % | Pt ppm | λ80/λ70 nm |
| 55a | 150 | 40 | 4.8 | 320 | — | 1.31 | 76.9 | 0.66 | 422 |
| 56a | 100 | 40 | 4.8 | 320 | 4 | 1.53 | 77.2 | 0.37 | 421 |

As shown in Table 9, depending on the presence of the antimony oxide in the glass, it was confirmed that the value of βOH of the glass substantially has no change (samples 51 to 56, and samples 51a to 56a).

Also, even in case of using the batch raw material added with antimony oxide, the optical glass sample produced according to the present invention was confirmed to have excellent transmittance even after the heat treatment, and also it was confirmed that the amount of Pt dissolved in the glass was reduced (samples 53a to 56a).

Example 3

The optical glass samples (the glass blocks) produced in the examples 1 and 2 were divided, and depending on the needs, further processing was carried out, thereby the glass material for press-molding corresponding to each optical glass was obtained.

The glass material for press-molding obtained as such was heated and softened in the air then press-molded, thereby the optical element blank close to the lens shape was produced.

Next, the optical element blank obtained was annealed in the air, then the processing such as grinding and polishing were carried out, thereby the glass made optical element made of glass such as lens and prism or so corresponding to each sample of the examples 1 and 2 were produced.

Note that, the temperature decreasing speed during the annealing was set so that the refractive index of the optical element becomes the desired value.

Also, for the press-molding method of the glass, the annealing method, the grinding method and the polishing method or so of the lens blank, the known methods were used.

The optical element produced by using the optical glass sample (samples 13 to 16, samples 24 to 26, samples 33 to 35, samples 43 to 46, samples 53 to 56, samples 63 to 66, samples 72, samples 73, samples 82 to 84, samples 53a to 56a) was confirmed with the significant coloring reduction by carrying out the heat treatment in the oxidizing atmosphere such as air or so in between the molding of the molten glass and the processing of the optical element blank.

On the other hand, the optical element produced by using the optical glass samples (sample 11, sample 12, samples 21 to 23, sample 31, sample 32, sample 41, sample 42, sample 51, sample 52, sample 61, sample 62, sample 71, sample 81, sample 51b and sample 52b) produced by the production method corresponding to the comparative example of the present invention had the coloring remaining, and the coloring reduction effect was confirmed to be low even after going through the heat treatment in the oxidizing atmosphere of air or so in between the molding of the molten glass and the processing of the optical element blank.

[Examples According to the First Modified Example]

Next, FIG. 5 shows the graph plotting βOH of the optical glass sample produced in the example 1 of the first example in terms of each refractive index nd of the glass from the point of the first modified example.

In FIG. 5, the bold line shows the border line separating the example and the comparative example based on the below equation (6).

$$\beta OH \geq 181.39 \times nd^{-3} - 325.75 \times nd^{-2} + 194.85 \times nd^{-1} - 38.1 \quad (6)$$

Here, "nd" in the equation (6) shows the refractive index of said glass.

[Examples According to the Second Modified Example]

Next, the examples according to the second modified example will be shown. Note that, for the second modified example, it is not to be limited to the below examples. Also, herein below, the number of the examples will be renewed.

Examples 1 to 6

The batch raw material was carried out with the rough melting to produce the cullet, and the cullet was placed in the crucible made of platinum and heated, melted and molded, then each optical glass having the composition shown in No. 1 to No. 4 of Table 1 and Table 2 were produced by the below described order.

First, phosphates, orthophosphoric acid, oxides, carbonates, nitrates, sulfates were scaled and thoroughly mixed to prepare the raw material (the batch raw material). Next, this batch raw material was placed into the container made of quartz, and the optical glass of No. 1 and No. 2 were heated within the range of liquidus temperature 800 to 1400° C., and the optical glass of No. 3 and No. 4 were heated at the range of liquidus temperature LT to 1300° C., thereby molten glass was made, and the cullet raw material was produced by dropping this molten glass into the water.

Next, the cullet raw material was dried, then the cullet raw material was re-mixed, and introduced into the crucible made of platinum (the melting container) then the lid made of platinum was placed on. While under this condition, the cullet raw materials in the crucible made of platinum were heated in the range of liquidus temperature LT to 1300° C. for the glass composition of the cullet raw material of the optical glass of No. 1 and No. 2, and in the range of liquidus temperature LT to 1250° C. for the glass composition of the cullet raw material of the optical glass of No. 3 and No. 4; then the cullet war material were melted and molten glass was obtained (melting step).

Further, for the optical glass of No. 1 and No. 2, after refining the molten glass by raising the temperature within the range of the liquidus temperature LT to 1400° C. (the refining step), the temperature was decreased within the range of the liquidus temperature LT to 1300° C.; and for optical glass of No. 3 and No. 4, after refining the molten glass by raising the temperature within the range of the liquidus temperature LT to 1300° C. (the refining step), the temperature was decreased within the range of the liquidus temperature LT to 1250° C. Then, these were uniformed by stirring (the uniforming step), and the molten glass being refined and uniformed were introduced into the mold by draining out from the glass draining pipe. Thereby, the glass block was molded.

Note that, when carrying out the melting step, the refining step, the uniforming step, the pipe made of platinum was inserted into the crucible made of platinum from the opening part provided at the lid made of platinum, and depending on the needs, the water vapor was able to be supplied to the space in the crucible made of platinum via this pipe made of the platinum. The flow amount of the water vapor per unit time supplied into the crucible made of platinum is shown in Table 10. Note that, the flow amount of the water vapor shown in Table 10 is the value converted in the flow amount at usual temperature, and the unit is litter/min. Also, in case the water vapor is not supplied into the crucible, the crucible made of platinum is covered by the lid made of platinum and without the opening part; and the water was suppressed from evaporating from the cullet material and the molten glass during the melting by sealing the crucible made of platinum between the melting step to the uniforming step via the refining step.

Next, each glass block made of the optical glass of No. 1 and the optical glass of No. 2 was increased with the temperature to 600° C. from 25° C. in air taking 2 hours, then annealed at 600° C. (the heat treatment), then carried out with the procedure to reduce the coloring of the glass block (the optical glass material). Then, the glass block was cooled to the usual temperature at the temperature decreasing speed of −30° C./hour. Note that, glass block was maintained at 600° C. for 1 hour.

Also, the above glass block according to the optical glass of No. 3 and the optical glass of No. 4 were increased with the temperature to 570° C. from 25° C. in air taking 2 hours, and annealed at 570° C. (the heat treatment), then carried out the procedure to reduce the coloring of the glass block (the optical glass material). Then, the glass block was cooled to the usual temperature at the temperature decreasing speed of −30° C./hour. Note that, glass blocks were maintained at 570° C. for 4 hours and 30 minutes.

After the annealing, βOH value, λτ80, the refractive index nd, Abbe number νd, and the glass transition temperature of the glass block (the optical glass) were measured. For the optical glass of No. 1 and No. 3, βOH value, T450 and λτ80 are shown in Table 10; and for the optical glass of No. 1 to No. 4, the refractive index nd, Abbe number νd and the glass transition temperature Tg are shown in Table 1 and Table 2.

Note that, the measured values of the refractive index nd and Abbe number νd are the value measured using the sample cooled at the cooling speed of 30° C. per hour. For the measured value of the liquidus temperature LT, the sample was re-heated, and maintained for 2 hours, then cooled to room temperature. Then, the presence of the crystal precipitation inside the glass was verified by the optical microscope, and the lowest temperature of which the crystal is not present was set as the liquidus temperature.

The examples 1 to 3 of Table 10 are the data regarding the optical glass produced without introducing the water vapor in the melting container from the pipe made of platinum; and the examples 4 to 6 are the data regarding the optical glass produced by introducing the water vapor into the melting container from the pipe made of platinum. The examples 1 to 3 used orthophosphoric acid raw material, and also the air tightness of the melting container was enhanced, thereby the water was introduced into the molten glass and suppressed the evaporation of the water vapor from the melting container. Further, for the examples 4 to 6, the water vapor partial pressure in the melting container was actively increased.

When T450 and λτ80 of the optical glass of the examples 1 to 3, and T450 and λτ80 of the optical glass of the examples 4 to 6 were compared, the examples 4 to 6 wherein the water vapor partial pressure inside the melting container was actively increased had larger βOH value as well; and it can be understood that even more significant reduction of the coloring degree has been done. As such, the optical glass having the composition of No. 1 shown in Table 1 and No. 3 of Table 2 having little coloring due to the heat treatment can be obtained.

TABLE 10

| | Flow amount of the water vapor [litter/min] | βOH [mm$^{-1}$] No.1 | βOH [mm$^{-1}$] No.3 | T450 [%] No.1 | T450 [%] No.3 | λ80 [nm] No.1 | λ80 [nm] No.3 |
|---|---|---|---|---|---|---|---|
| Example 1 | 0 | 0.77 | 0.14 | 67.75 | 14.25 | 502 | — |
| Example 2 | 0 | 0.52 | 0.17 | 58.06 | 15.42 | — | — |
| Example 3 | 0 | 0.38 | 0.21 | 51.96 | 25.6 | — | — |
| Example 4 | 2 | 1.53 | 0.97 | 77.99 | 64.76 | 423 | 457 |
| Example 5 | 2 | 1.62 | 1.17 | 73.35 | 68.2 | 417 | 450 |
| Example 6 | 2 | 1.69 | 1.17 | 76.50 | 65.21 | 422 | 455 |

Note that, for the examples 1 to 6, even if the optical glass to be produced is changed from the optical glass composition of No. 1 shown in Table 1 to the optical glass composition shown in Table 2, or even if it is changed from the optical glass composition of No. 3 to the optical glass composition of No. 4, the coloring degree can be made smaller significantly. Also, for the examples 1 to 6, the crucible made of platinum was used as the melting container, however the optical glass having significantly smaller coloring degree can be obtained by using the crucible made of platinum alloy, gold, gold alloy or so as the melting container to produce the optical glass, then carrying out the heat treatment to the obtained optical glass. Further, for the examples 4 to 6, the water vapor was supplied into the platinum crucible covered with lid via the pipe, however the same effect can be obtained by bubbling the water vapor into the molten glass in the platinum crucible. This is same even when the optical glass to be produced is changed to the composition of No. 2 shown in Table 1 and the composition of No. 4 shown in Table 4.

Also, in the examples 4 to 6, as the water vapor supplied into the crucible made of platinum, the water vapor obtained by boiling the water using the boiler was used. However, when producing the optical glass material, the water vapor obtained by other method can be used accordingly. For example, the water sprayed in a mist form to the glass melting furnace of flame resistant which houses the melting container such as crucible made of platinum or so to make the water vapor, then water vapor partial pressure of the atmosphere inside the glass melting furnace and the melting container may be increased. Alternatively, the water may be supplied into the glass melting furnace using the pump, and boiling the water by the heat inside the melting furnace, thereby forming the water vapor and the water vapor partial pressure in the glass melting atmosphere may be increased; or other method may be used as well. The water content in the optical glass material can be increased by using these methods.

Comparative Example 1

The glass block (the optical glass material) was produced as same as the examples 1 to 3 except that it was maintained opened by removing the lid made of platinum, then the heat treatment was carried out as same as the examples 1 to 6. However, the coloring degrees of the glass block (the optical glass) being heat treated was larger than the examples 1 to 6.

Also, the glass block (the optical glass material) was produced as same as the comparative example 1 except that the glass composition was the glass composition of No. 2 and No. 4 instead of No. 1 and No. 3, and the heat treatment was carried out. However, the coloring degrees of the glass block the optical glass material) being heat treated was larger than the examples 1 to 6.

Comparative Example 2

Except for introducing nitrogen gas instead of water vapor into the melting container, the glass block (the optical glass material) was produced as same as the examples 4 to 6, and the heat treatment was carried out as same as the examples 1 to 6. The coloring degree of the glass block (the optical glass) being heat treated was significantly larger than the glass block (the optical glass) of the comparative example 1.

Comparative Example 3

The glass block (the optical glass material) was produced as same as the examples 4 to 6 except that the reducing gas was introduced into the melting furnace instead of the water vapor, then the heat treatment was carried out as same as the examples 1 to 6. However, the coloring degree of the glass block being heat treated (the optical glass) was extremely larger than the glass block (the optical glass) of the comparative example 1.

Note that, if the concentration of the reducing gas is high, the reducing gas component forms alloy with the platinum crucible, and causes to break the crucible. This is same for the cases when the glass composition is changed to the composition of No. 2 shown in Table 1 and No. 4 shown in Table 2.

(The Detail of the Observation Result of the Coloring Degree of the Glass Block at Before and after the Heat Treatment)

The observation results of the coloring degree of before and after the heat treatment of the glass block produced in the examples and the comparative examples are shown in Table 11. Note that, the coloring degree was evaluated by placing the glass block having planar shape of approximate circular shape on the white paper and visually observing under the room light. Note that, the glass block of the examples and the comparative examples used for the observation had approximately the same thickness. Also, the evaluation standard of the transparency shown in Table 11 is as follows. A: although the glass block (the optical glass) is lightly colored, it is clear enough to recognize the whiteness of the paper positioned below the glass block (the optical glass) (High transparency). B: although the glass block (the optical glass) is colored, it is clear enough to recognize the paper positioned below the glass block (the optical glass) (moderate transparency). C: the glass block (the optical glass) is heavily colored, and it has low transparency such that the paper positioned below the glass block (the optical glass) can be barely recognized (low transparency). D: the glass block (the optical glass) is completely opaque, and the paper positioned below the glass block (the optical glass) cannot be recognized (opaque).

TABLE 11

| | Composition; No.1 and No.2 | | | | Composition; No.3 and No.4 | | | |
| --- | --- | --- | --- | --- | --- | --- | --- | --- |
| | Before heat treatment (right after the molding) | | After heat treatment | | Before heat treatment (right after the molding) | | After heat treatment | |
| | Color | Clarity | Color | Clarity | Color | Clarity | Color | Clarity |
| Example 1 to 3 | dark brown | D | yellow | A | black | D | yellow | A |
| Example 4 to 6 | dark brown | D | light yellow | A | black | D | light yellow | A |
| Comparative example 1 | brown | C | brown | B | dark purple | C | purple | B |
| Comparative example 2 | black | D | dark brown | D | black | D | dark purple | D |

(The Verification of Platinum being Mixed)

Among the glass blocks of after the heat treatment which were used in the examples 1 to 6 and the comparative examples 1 to 3, the inside of the glass blocks were observed by the optical microscope except for those having "D" for the transparency evaluation. As a result, no platinum contaminant being mixed or the crystal precipitated was found in the inside of all the glass blocks. Also, the platinum dissolved amount in the glass block used in the examples the examples 1 to 6 and the comparative examples 1 to 3 were measured by ICP spectrometry, the results were less than 2 ppm for all cases.

Example 7

The optical glass produced in the examples 1 to 6 were processed into a glass material for press-molding, then heating, softening and a press-molding were carried out, thereby the optical element blank was produced. Further, the optical element blank was processed and the optical element such as spherical lens and prisms or so was produced. Further, to the lens surface or the prism surface, the anti-reflection film was coated; thereby the final product was obtained. For the optical glass of No. 2 shown in Table 1 and No. 4 shown in Table 2, the glass material for press-molding, the optical element blank and the optical element were produced as same.

Hereinafter is the summary regarding the main embodiments and various modified examples.

The glass of the embodiment according to the first modified example has the refractive index of 1.75 or more, and βOH value shown in below equation (1) satisfies the below equation (6).

$$\text{BOH} = -[\ln(B/A)]/t \quad (1)$$

$$\beta \text{OH} \geq 181.39 \times nd^{-3} - 325.75 \times nd^{-2} + 194.85 \times nd^{-1} - 38.1 \quad (6)$$

[In the equation (1), "t" is a thickness of said glass used for a measurement of an external transmittance, "A" is the external transmittance (%) at a wavelength of 2500 nm when a light enters into said glass in parallel to a thickness direction thereof, and "B" is s the external transmittance (%) at the wavelength of 2900 nm when a light enters into said glass in parallel to the thickness direction thereof. Also, "ln" is natural logarithm. In the equation (6), "nd" is the refractive index of said glass.] Note that, the unit of βOH is $mm^{-1}$.

The preferable glass of the embodiment according to the first modified example has the content of the noble metal of 4 ppm or less in the glass.

The preferable glass of the embodiment according to the first modified example includes $P_2O_5$ as said glass component.

The preferable glass of the first embodiment according to the second modified example has the refractive index nd of 1.9 or more and less than 1.97, and it is the oxide glass comprising at least one oxide selected from the group consisting of $TiO_2$, $Nb_2O_5$, $WO_3$ and $Bi_2O_3$ as a glass component, wherein a total content of said $TiO_2$, $Nb_2O_5$, $WO_3$ and $Bi_2O_3$ is within the range of 30 mol % to 60 mol %, and βOH value shown in below equation (1) is 0.1 $mm^{-1}$ or more.

$$\beta \text{OH} = -[\ln(B/A)]/t \quad (1)$$

[In the equation (1), "t" is a thickness of said glass used for a measurement of an external transmittance, "A" is the external transmittance (%) at a wavelength of 2500 nm when a light enters into said glass in parallel to a thickness direction thereof, and "B" is s the external transmittance (%) at the wavelength of 2900 nm when a light enters into said glass in parallel to the thickness direction thereof. Also, "ln" is natural logarithm.]

The preferable glass of the first embodiment according to the second modified example includes $P_2O_5$ as said glass component within the range of 15 mol % to 35 mol %.

The preferable glass of the second embodiment according to the second modified example has the refractive index nd of 1.97 or more, and it is the oxide glass comprising at least one oxide selected from the group consisting of $TiO_2$, $Nb_2O_5$, $WO_3$ and $Bi_2O_3$ as a glass component, wherein a total content of said $TiO_2$, $Nb_2O_5$, $WO_3$ and $Bi_2O_3$ is within the range of 40 mol % to 80 mol %, and βOH value shown in below equation (1) is 0.1 $mm^{-1}$ or more.

$$\beta \text{OH} = -[\ln(B/A)]/t \quad (1)$$

[In the equation (1), "t" is a thickness of said glass used for a measurement of an external transmittance, "A" is the external transmittance (%) at a wavelength of 2500 nm when a light enters into said glass in parallel to a thickness direction thereof, and "B" is s the external transmittance (%) at the wavelength of 2900 nm when a light enters into said glass in parallel to the thickness direction thereof. Also, "ln" is natural logarithm.]

The preferable glass of the second embodiment according to the second modified example includes $P_2O_5$ as said glass component within the range of 10 mol % to 35 mol %.

The preferable glass of the first and the second embodiment according to the second modified example satisfies the below equation (11).

$$\lambda \tau 80 < aX + b \quad (11)$$

[In the equation (11), λτ80 refers to the wavelength (nm) wherein the internal transmittance (internal transmittance τ) is 80% which is calculated first by measuring the internal transmittance at the range of the wavelength 280 to 700 nm when the light enter into the optical glass parallel to the thickness direction thereof, then assuming that the thickness of the optical glass based on the internal transmittance measured thereby is 10 mm. "a" is the constant (1.8359 nm/mol %), "b" is the constant (351.06 nm), and X is a total content (mol %) of said $TiO_2$, $Nb_2O_5$, $WO_3$ and $Bi_2O_3$]

The preferable glass of the first and the second embodiment according to the second modified example includes the content of the antimony oxide of less than 1000 ppm in terms of $Sb_2O_3$.

Further, preferable glass of the main embodiment and the above mentioned modified example is a glass comprising 25 mol % or more of a total content of said $TiO_2$, $Nb_2O_5$, $WO_3$ and $Bi_2O_3$, more preferably of 30 mol % or more, and further preferably of 35 mol % or more.

The preferable glass of the main embodiment and the above mentioned modified example is a glass wherein the content of $P_2O_5$ is larger than the content of $SiO_2$ in mol % expression.

The preferable glass of the main embodiment and the above mentioned modified example is a glass wherein the content of $P_2O_5$ is larger than the content of $B_2O_3$ in mol % expression.

The preferable glass of the main embodiment and the above mentioned modified example is a glass wherein the content of $P_2O_5$ is larger than the total content of $SiO_2$ and $B_2O_3$ in mol % expression.

The preferable glass of the main embodiment and the above mentioned modified example is a glass wherein the content of $P_2O_5$ is 10 mol % or more.

The preferable glass of the main embodiment and the above mentioned modified example is a glass wherein the content of $P_2O_5$ is 40 mol % or less.

The preferable glass of the main embodiment and the above mentioned modified example has a content of $GeO_2$ of 0 to 10 mol %, more preferably of 0 to 5 mol %, further preferably of 0 to 3 mol %, even more preferably of 0 to 2 mol %, even further preferably of 0 to 1 mol %, and even furthermore preferably of 0 to 0.5 mol %.

The preferable glass of the main embodiment and the above mentioned modified example has a content of $TeO_2$ of 0 to 10 mol %, more preferably of 0 to 5 mol %, further preferably of 0 to 3 mol %, even more preferably of 0 to 2 mol %, even further preferably of 0 to 1 mol %, and even furthermore preferably of 0 to 0.5 mol %.

The preferable glass of the main embodiment and the above mentioned modified example has the content of $Sb_2O_3$ of 0 ppm or more and less than 1000 ppm; and further preferable glass has the content of $Sb_2O_3$ of 900 ppm or less, more preferably 800 ppm or less, and even more preferably of 700 ppm or less, even further preferably of 600 ppm or less, still more preferably of 500 ppm or less, and it is even preferable in the order of 400 ppm, 300 ppm, 200 ppm, 100 ppm.

The preferable glass of the main embodiment and the above mentioned modified example has the total amount of $P_2O_5$, $SiO_2$, $B_2O_3$, $TiO_2$, $Nb_2O_5$, $WO_3$, $Bi_2O_3$, MgO, CaO, SrO, BaO, ZnO, $Li_2O$, $Na_2O$, $K_2O$, $Al_2O_3$, $ZrO_2$, $GeO_2$, $TeO_2$ and $Sb_2O_3$ of preferably 90% or more, more preferably 92% or more, further preferably 95% or more, even more preferably 96% or more, even further preferably 97% or more, still more preferably 98% or more, and yet more preferably more than 99%.

The glass of the main embodiment and the above mentioned modified example is preferably substantially be free of Pb, As, Cd, U, Th and Tl from the point of reducing the environmental load.

The glass of the main embodiment and the above mentioned modified example is preferably substantially free of the additives and the components which have absorbance in the visible range such as Cu, Cr, Mn, Fe, Co, Ni, V, Mo, Nd, Eu, Er, Tb, Ho, Pr or so.

The preferable glass of the main embodiment and the above mentioned modified example has the content of the noble metal of 4 ppm or less in the obtained glass. The preferable upper limit of the noble metal included in the glass is 3 ppm, 2.7 ppm, 2.5 ppm, 2.2 ppm, 2.0 ppm, 1.8 ppm, 1.6 ppm, 1.4 ppm, 1.2 ppm, 1.1 ppm, 1.0 ppm, 0.9 ppm; and the lower the upper limit is the more preferable it is.

The preferable glass of the main embodiment and the above mentioned modified example has the content of Pt of 4 ppm or less in the obtained glass. The preferable upper limit of the noble metal included in the glass is 3 ppm, 2.7 ppm, 2.5 ppm, 2.2 ppm, 2.0 ppm, 1.8 ppm, 1.6 ppm, 1.4 ppm, 1.2 ppm, 1.1 ppm, 1.0 ppm, 0.9 ppm; and the lower the upper limit is the more preferable it is.

The preferable glass of the main embodiment and the above mentioned modified example has the refractive index nd of 1.75 or more, more preferably 1.80 or more, further preferably of 1.85 or more, and even more preferably of 1.90 or more.

The preferable glass of the main embodiment and the above mentioned modified example is an optical glass.

The invention claimed is:

1. An optical glass which is a phosphate glass comprising at least one oxide selected from the group consisting of $TiO_2$, $Nb_2O_5$, $WO_3$ and $Bi_2O_3$ as a glass component, wherein
a refractive index nd is 1.75 or more, and
a value of βOH shown in the below equation (1) satisfies the relation shown in the below equation (6);

$$\beta OH = -[\ln(B/A)]/t \quad (1);$$

$$\beta OH \geq 181.39 \times nd^{-3} - 325.75 \times nd^{-2} + 194.85 \times nd^{-1} - 38.1 \quad (6);$$

in the equation (1), "t" is a thickness of said glass used for a measurement of an external transmittance, "A" is the external transmittance (%) at a wavelength of 2500 nm when a light enters into said glass in parallel to a thickness direction thereof, "B" is the external transmittance (%) at the wavelength of 2900 nm when a light enters into said glass in parallel to the thickness direction thereof, and "ln" is natural logarithm; in the equation (6), "nd" is the refractive index of said glass at the wavelength 587.56 nm.

2. The optical glass as set forth in claim 1, wherein a content of $P_2O_5$ is larger than a content of $B_2O_3$ in terms of mol % expression.

3. The optical glass as set forth in claim 1, wherein a content of $TiO_2$ is 1 mol % or more.

4. The optical glass as set forth in claim 1, wherein a content of $Sb_2O_3$ is 0 ppm or more and less than 1000 ppm.

5. The optical glass as set forth in claim 1, wherein a content of $Sb_2O_3$ is 0 ppm or more and 500 ppm or less.

6. The optical glass as set forth in claim 1 wherein substantially free of V.

7. The optical glass as set forth in claim 1, wherein a content of noble metal is 4 ppm or less.

8. The optical glass as set forth in claim 1, wherein a content of Pt is 2.0 ppm or less.

9. The optical glass as set forth in claim 1, wherein the glass transition temperature Tg is 541° C. or more.

10. A glass material for press-molding comprising the optical glass as set forth in claim 1.

11. An optical element comprising the optical glass as set forth in claim 1.

* * * * *